(12) United States Patent
Tiede et al.

(10) Patent No.: US 9,415,818 B1
(45) Date of Patent: Aug. 16, 2016

(54) TRACK-MODULE APPARATUS WITH LOAD-INDEPENDENT LOAD DISTRIBUTION

(71) Applicant: ATI, Inc., Mt. Vernon, IN (US)

(72) Inventors: Duane Tiede, Naperville, IL (US); Jamsheed Reshad, Newburgh, IN (US); Timothy D. Stacy, Mt. Vernon, IN (US); Kenneth J. Juncker, Mt. Vernon, IN (US)

(73) Assignee: ATI, Inc., Mt. Vernon, IN (US)

( * ) Notice: Subject to any disclaimer, the term of this patent is extended or adjusted under 35 U.S.C. 154(b) by 0 days.

(21) Appl. No.: 14/625,229

(22) Filed: Feb. 18, 2015

(51) Int. Cl.
| | |
|---|---|
| *B62D 55/10* | (2006.01) |
| *B62D 55/104* | (2006.01) |
| *B62D 55/30* | (2006.01) |
| *B62D 55/112* | (2006.01) |
| *B62D 55/108* | (2006.01) |

(52) U.S. Cl.
CPC .............. *B62D 55/104* (2013.01); *B62D 55/10* (2013.01); *B62D 55/30* (2013.01); *B62D 55/108* (2013.01); *B62D 55/1083* (2013.01); *B62D 55/1086* (2013.01); *B62D 55/112* (2013.01)

(58) Field of Classification Search
CPC .... B62D 55/10; B62D 55/104; B62D 55/108; B62D 55/1083; B62D 55/1086; B62D 55/112; B62D 55/1125
See application file for complete search history.

(56) References Cited

U.S. PATENT DOCUMENTS

| | | | | |
|---|---|---|---|---|
| 3,094,794 A * | 6/1963 | Wardle | ............ | B62D 55/108 37/304 |
| 3,841,424 A | 10/1974 | Purcell et al. | | |
| 4,874,052 A * | 10/1989 | Purcell | ............ | B60G 5/06 180/24.02 |
| 5,273,126 A * | 12/1993 | Reed | ............ | B62D 49/0635 180/9.21 |
| 5,997,109 A * | 12/1999 | Kautsch | ............ | B62D 55/305 305/128 |
| 6,283,562 B1 * | 9/2001 | Tsubota | ............ | B62D 55/00 180/308 |
| 7,628,235 B2 | 12/2009 | Satzler et al. | | |
| 9,051,009 B2 * | 6/2015 | Prohaska | ............ | B62D 11/22 |
| 2004/0140138 A1 * | 7/2004 | Brazier | ............ | B62D 49/0635 180/9.21 |
| 2013/0154345 A1 | 6/2013 | Schulz et al. | | |
| 2014/0138169 A1 * | 5/2014 | Fairhead | ............ | B62K 3/002 180/9.5 |
| 2015/0321708 A1 * | 11/2015 | Van Mill | ............ | B62D 55/06 280/28.5 |

FOREIGN PATENT DOCUMENTS

EP 2727803 5/2014

* cited by examiner

*Primary Examiner* — Anne Marie Boehler
*Assistant Examiner* — Marlon Arce
(74) *Attorney, Agent, or Firm* — Jansson Munger McKinley & Kirby Ltd.

(57) ABSTRACT

In vehicle track-module apparatus including a module frame, a drive wheel rotatable with respect to the frame, ground-engaging leading and trailing wheels, at least one ground-engaging bogie wheel, and an endless track extending around the wheels and driven by its engagement with the drive wheel, the improvement comprising: (a) a leading suspension arm rotatable with respect to the frame and extending forwardly to a distal end at which a leading-wheel assembly is rotatably attached and rearwardly to a rearward suspension end; (b) a trailing suspension arm rotatable with respect to the frame and extending rearwardly to a distal end at which a trailing-wheel assembly is rotatably attached and forwardly to a forward suspension end; (c) a bogie assembly having a bogie mount and the at least one bogie wheel rotatable with respect thereto; and (d) leading and trailing suspension elements rotatably attached to and extending from the rearward and forward suspension ends, respectively, to rearward and forward rotatable bogie-mount connections, respectively.

48 Claims, 22 Drawing Sheets

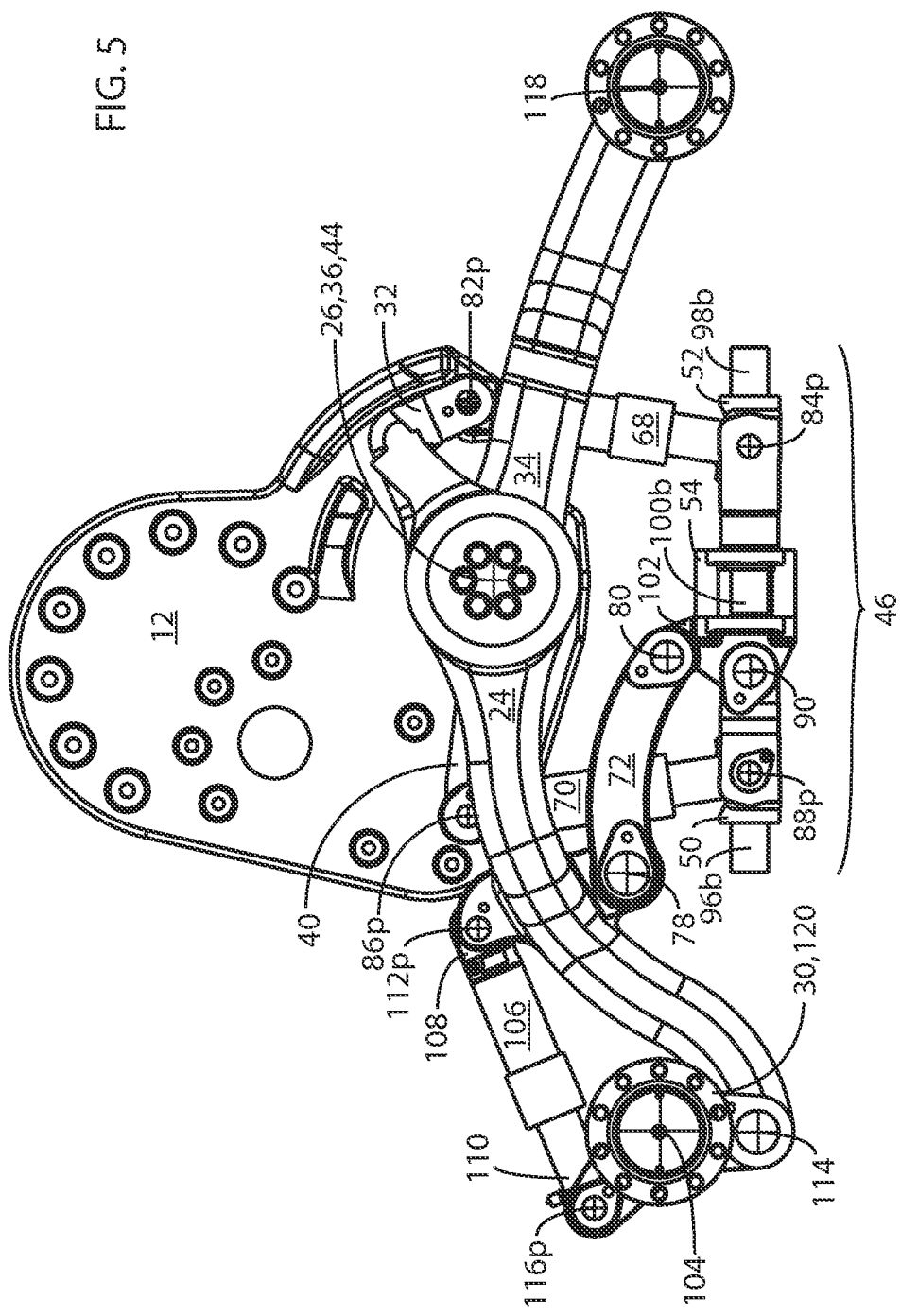

SECTION A-A

FIG. 16 - Reference Number Listing

| # | Description | # | Description |
|---|---|---|---|
| 10 | track-module apparatus | 86p | trailing suspension-element pivot |
| 10a | first alternative embodiment of track-module apparatus | 88p | second bogie-assembly pivot |
| | | 90 | third bogie-assembly axis |
| 10b | second alternative embodiment of track-module apparatus | 92 | rearward bogie-mount connection |
| | | 94 | forward bogie-mount connection |
| 10c | third alternative embodiment of track-module apparatus | 96 | leading bogie roll axis |
| | | 96a | leading bogie axle assembly |
| 10d | fourth alternative embodiment of track-module apparatus | 96b | leading bogie roll axis bearing |
| | | 98 | trailing bogie roll axis |
| 10t | track-module embodiment with trailing tensioning element | 98a | trailing bogie axle assembly |
| | | 98b | trailing bogie roll axis bearing |
| 11 | connection to vehicle | 100 | middle bogie roll axis |
| 12 | module frame | 100a | middle bogie axle assembly |
| 14 | drive wheel | 100b | middle bogie roll axis bearing |
| 14g | drive gearbox | 102 | bogie-mount arm |
| 14p | drive power input shaft | 104 | leading-idler axis |
| 16 | drive wheel axis | 106 | tensioning element |
| 18 | leading idler wheel | 108 | tensioning-element first end |
| 20 | trailing idler wheel | 110 | tensioning-element second end |
| 22 | endless polymeric track | 112p | proximal tensioning pivot |
| 24 | leading suspension arm | 112b | spherical bearing ball of pivot 112p |
| 26 | leading arm axis | 112c | connector of pivot 112p |
| 28 | leading-arm distal end | 112s | spherical bearing socket of pivot 112p |
| 30 | leading-idler assembly | 114 | idler offset axis |
| 32 | rearward suspension end | 116p | distal tensioning pivot |
| 34 | trailing suspension arm | 118 | trailing-idler axis |
| 36 | trailing arm axis | 120 | idler linkage |
| 38 | trailing-arm distal end | 122 | direction-of-travel arrow |
| 40 | forward suspension end | 124 | ground |
| 42 | trailing-idler assembly | 126 | bump on ground |
| 44 | suspension-arm axis | 128 | uphill portion of ground |
| 46 | bogie assembly | 130 | downhill portion of ground |
| 48 | bogie mount | 132 | pivot connecting |
| 50 | bogie-mount forward portion | 134 | hydraulic circuit |
| 52 | bogie-mount rearward portion | 136 | hydraulic cylinder |
| 54 | bogie-mount middle portion | 138 | gas-filled cylinder |
| 56 | leading bogie wheel | 140 | piston |
| 58 | leading bogie axis | 142 | seal |
| 60 | trailing bogie wheel | 144 | hydraulic fluid |
| 62 | trailing bogie axis | 146 | gas |
| 64 | middle bogie wheel | 148 | hydraulic conduit |
| 66 | middle bogie axis | 150 | external accumulator |
| 68 | leading suspension element | 152 | accumulator piston |
| 70 | trailing suspension element | 154 | accumulator seal |
| 72 | bogie-assembly arm | 156 | accumulator conduit |
| 74 | bogie-assembly arm distal end | FL | supported load |
| 76 | bogie-assembly arm proximal end | F1 | resultant leading idler wheel load |
| 78 | first bogie-assembly axis | F2 | resultant leading bogie wheel load |
| 80 | second bogie-assembly axis | F3 | resultant middle bogie wheel load |
| 82p | leading suspension-element pivot | F4 | resultant trailing bogie wheel load |
| 84p | first bogie-assembly pivot | F5 | resultant trailing idler wheel load |

FIG. 17A: Exemplary Dimensions

| Linkage | Inches |
| --- | --- |
| H 44:104 | 38 |
| H 44:56 | 16.75 |
| H 44:66 | -2 |
| H 44:62 | 12.75 |
| H 44:118 | 34 |
| H 44:86 | 16.25 |
| H 44:88 | 13.25 |
| H 44:82 | 12.25 |
| H 44:84 | 9.25 |
| H 44:90 | 6.25 |
| H 44:78 | 20.2 |
| H 44:80 | 7.25 |
| H 44:112 | 24 |
| H 44:116 | 43.25 |
| H 44:114 | 38 |
| V 44:104 | 11.46 |
| V 44:56 | 17.58 |
| V 44:66 | 17.58 |
| V 44:62 | 17.58 |
| V 44:118 | 11.46 |
| V 44:86 | 1.7 |
| V 44:88 | 17.58 |
| V 44:82 | 1.7 |
| V 44:84 | 17.58 |
| V 44:90 | 17.58 |
| V 44:78 | 9.25 |
| V 44:80 | 13.38 |
| V 44:112 | 1 |
| V 44:116 | 7 |
| V 44:114 | 18.21 |
| D 18,20 | 26 |
| D 56,60,64 | 13.75 |
| V 44:16 | 21.2 |
| H 44:16 | 6 |
| D 12 | 30.6 |

FIG. 17B: Exemplary Load Distributions

| Vehicle weight (low) | Loads (lb) | Load distribution | |
|---|---|---|---|
| 1/2 axle weight | 16,500 | F1 | 11.32% |
| belt tension | - | F2 | 23.93% |
| pull | - | F3 | 23.93% |
| braking | - | F4 | 23.93% |
| | | F5 | 16.88% |

| Vehicle weight (high) | Loads (lb) | Load distribution | |
|---|---|---|---|
| 1/2 axle weight | 55,000 | F1 | 11.32% |
| belt tension | - | F2 | 23.93% |
| pull | - | F3 | 23.93% |
| braking | - | F4 | 23.93% |
| | | F5 | 16.88% |

| Belt tension, nominal pull | Loads (lb) | Load distribution | |
|---|---|---|---|
| 1/2 axle weight | 16,500 | F1 | 4.26% |
| belt tension | 6,000 | F2 | 28.03% |
| pull | 4,600 | F3 | 28.03% |
| braking | - | F4 | 28.03% |
| | | F5 | 11.66% |

| Belt tension, high pull, high weight | Loads (lb) | Load distribution | |
|---|---|---|---|
| 1/2 axle weight | 55,000 | F1 | 9.68% |
| belt tension | 6,000 | F2 | 26.18% |
| pull | 17,000 | F3 | 26.18% |
| braking | - | F4 | 26.18% |
| | | F5 | 11.78% |

| Emergency braking, low weight | Loads (lb) | Load distribution | |
|---|---|---|---|
| 1/2 axle weight | 16,500 | F1 | 0.00% |
| belt tension | - | F2 | 26.99% |
| pull | - | F3 | 26.99% |
| braking | 29,000 | F4 | 26.99% |
| | | F5 | 19.03% |

TRACK-MODULE APPARATUS WITH LOAD-INDEPENDENT LOAD DISTRIBUTION

FIELD OF THE INVENTION

The invention relates generally to the field of vehicle track-module systems of the type typically for use in place of vehicle wheels and, more particularly, to track modules having leading and trailing wheels and at least one load-supporting bogie wheel between the leading and trailing wheels, all of which are engaged by an endless track extending around the wheels to drive a vehicle along the ground.

BACKGROUND OF THE INVENTION

Agricultural vehicles such as tractors, combines and the like are commonly used in agricultural fields for a variety of jobs, and construction vehicles and other large work vehicles are used for many different jobs on a variety of ground surfaces. Typically, these vehicles have large wheels with tires on which the vehicles are supported on the ground. However, for improved traction, vehicle track-module systems (or "track modules" or "track-module apparatus") are used in place of wheels with tires, and such track-module systems provide a much larger ground-surface engagement area supporting vehicle weight and tends to prevent vehicles from becoming bogged down in mud or other soft ground surfaces.

Among the challenges encountered in the use of vehicle track-module apparatus is the need to distribute the load supported by the track module among the various wheels. These loads are both static and dynamic and may change during operation of the vehicle. Loads change as the vehicle encounters uneven ground, as the vehicle turns and as the slope of the ground being traversed changes. Ideally, all wheels remain in contact with the ground through the endless belt and share a portion of the load at all times.

One track-module unit which is intended to distribute load relatively evenly is disclosed in U.S. Pat. No. 7,628,235 (Satzler et al.) owned by CLAAS Industrietechnik GmbH of Paderhorn, Germany. A vehicle track roller unit is disclosed which has at least one pivotable subframe and at least one further pivotable subframe, and each of the subframes rotatably accommodates at least one land wheel. At least one subframe is pivotably mounted on the vehicle, and the at least one further subframe is pivotably mounted on the at least one pivotable subframe.

Another vehicle track-module unit is disclosed in United States Published Patent Application No. 2013/0154345 (Schultz et al.) owned by CLAAS Selbstfahrende Erntemaschinen GmbH of Harsewinkel, Germany. A vehicle track unit is disclosed which has a plurality of supporting rollers arranged one behind the other in the direction of travel of the vehicle and around which a belt is wrapped. The rollers are adjusted by way of at least one actuator between a first configuration, in which all supporting rollers are loaded, and a second configuration, in which at least one outer roller of the supporting rollers is relieved. An energy source delivers drive energy required to adjust the configuration. An energy accumulator is charged by the drive energy source and connected to the actuator in order to provide the actuator with the drive energy required to adjust the configuration.

CLAAS also has its Lexion Terra Trac product line which includes configurations which are intended to address some of these challenges. However, none of these prior art systems includes all of the elements of the present invention and meets the needs as outlined above.

OBJECTS OF THE INVENTION

It is an object of this invention to provide an improved vehicle track-module apparatus which has high load-supporting capability while maintaining lower contact forces on the ground by providing lower loading per axle from more even load distribution.

Another object of this inventive vehicle track-module apparatus is to minimize the unsprung mass of the track-module apparatus.

Another object of the inventive vehicle track-module apparatus is to provide track-module apparatus which shares load changes between axles.

A further object of the inventive vehicle track-module apparatus is to provide track-module apparatus in which each axle is able to move vertically in an independent manner.

Yet another object of the inventive vehicle track-module apparatus is to provide track-module apparatus in which the load distribution on the wheels is independent of vertical load.

Still another object of the inventive vehicle track-module apparatus is to provide track-module apparatus which has independent roll-mode movement for all bogie axes.

An additional object of this invention is to provide improved vehicle track-module apparatus which includes an articulating bogie assembly and which includes independent accommodation of bogie roll motion.

Yet another object of the present invention is to provide track-module apparatus which reduces wear on the flexible track.

These and other objects of the invention will be apparent from the following descriptions and from the drawings.

BRIEF SUMMARY OF THE INVENTION

This invention is an improvement in vehicle track-module apparatus which includes a module frame, a drive wheel rotatable with respect to the frame, leading and trailing ground-engaging wheels, at least one ground-engaging bogie wheel, and an endless track extending around the wheels and driven by its engagement with the drive wheel.

The inventive improvement comprises: (1) a leading suspension arm rotatably attached to the frame at a leading arm axis and extending forwardly to a leading-arm distal end at which a leading-wheel assembly is rotatably attached and rearwardly to a rearward suspension end; (2) a trailing suspension arm rotatably attached to the frame at a trailing arm axis and extending rearwardly to a trailing-arm distal end at which a trailing-wheel assembly is rotatably attached and forwardly to a forward suspension end; (3) a bogie assembly having a bogie mount and the at least one leading bogie wheel rotatable with respect thereto; and (4) leading and trailing suspension elements rotatably attached to and extending from the rearward and forward suspension ends, respectively, to rearward and forward rotatable bogie-mount connections, respectively.

The term "axis" as used herein pertains to a pivot joint which includes the necessary components such as bearings and other structure to permit rotation about such axis. A more complete description of the use of this and related terms is presented later in this document.

The term "suspension elements" as used herein refers to components in the suspension system which provide spring force and/or damping in the system.

The term "ground-engaging" as used herein with respect to a wheel means that the wheel bears on the ground through the endless track that engages the wheel under normal operating conditions.

The term "bogie wheel(s)" as used herein refers to one or more wheels providing support for a vehicle in a middle ground-engaging region of a track module, with other ground-engaging support being provided rearward and/or forward of the bogie wheels(s).

The term "therebetween" when referring to the position of ground-engaging bogie wheels means that the bogie wheels are positioned behind the leading ground-engaging wheel(s) and ahead of the trailing ground-engaging wheel(s) along the direction of travel. The term "idler" as used herein refers to a wheel which is not a driven wheel but turn only by virtue of its engagement with the endless track.

The term "load- and ground-responsive" as used herein with respect to suspension joints means that the above-ground positions of such joints are variable, including with respect to the frame, and depend on the contour of the ground under the track and on the total loading on the track module, however caused.

In some preferred embodiments of the improved vehicle track-module apparatus, the leading-arm and trailing-arm axes coincide at a suspension-arm axis. In some such embodiments, the suspension-arm axis is at a level lower than the drive wheel axis, and in some of these embodiments, the suspension-arm axis is rearward of drive wheel axis.

In highly-preferred embodiments, (a) the bogie assembly further includes a bogie-assembly arm rotatably attached (i) at a bogie-assembly arm distal end to the leading suspension arm at a first bogie-assembly axis between the leading-arm distal end and the suspension-arm axis and (ii) at a bogie-assembly arm proximal end to the bogie mount at a second bogie-assembly axis, (b) the leading suspension element is rotatably attached (i) to the rearward suspension end at a leading suspension-element pivot and (ii) to the rearward bogie-mount connection at a first bogie-assembly pivot, and (c) the trailing suspension element is rotatably attached (i) to the forward suspension end at a trailing suspension-element pivot and (ii) to the forward bogie-mount connection at a second bogie-assembly pivot.

In some of these highly-preferred embodiments, the at least one bogie wheel includes at least one leading bogie wheel and at least one trailing bogie wheel, and the bogie mount includes (a) a bogie-mount forward portion having the at least one leading bogie wheel attached thereto at a leading bogie axis, the bogie-mount forward portion including the forward bogie-mount connection, and (b) a bogie-mount rearward portion having the at least one trailing bogie wheel attached thereto at a trailing-bogie axis, the bogie-mount rearward portion including the rearward bogie-mount connection. Some of these embodiments may also include at least two leading bogie wheels and at least two trailing bogie wheels, and in these embodiments, the leading bogie axis rotates on a leading bogie roll axis perpendicular thereto and the trailing bogie axis rotates on a trailing bogie roll axis perpendicular thereto.

In some of the preferred embodiments, the bogie-mount forward and rearward portions are rotatably attached at a third bogie-assembly axis, and in some of these embodiments, the bogie mount further includes a bogie-mount middle portion having at least one middle bogie wheel attached thereto at a middle bogie axis.

In other highly-preferred embodiments, the inventive vehicle track-module apparatus includes at least two leading bogie wheels, at least two trailing bogie wheels, and at least two middle bogie wheels and (a) the leading bogie axis rotates on a leading bogie roll axis perpendicular thereto, (b) the middle bogie axis rotates on a middle bogie roll axis perpendicular thereto, and (c) the trailing bogie axis rotates on a trailing bogie roll axis perpendicular thereto. In some of these embodiments, the bogie-mount forward and middle portions are rotatably attached at a third bogie-assembly axis.

In certain highly-preferred embodiments, the vehicle track-module apparatus further includes a tensioning element having first and second ends, the first end rotatably attached to the leading suspension arm at a proximal tensioning pivot between the leading-arm distal end and the suspension-arm axis. In such embodiment, the leading-wheel assembly includes (a) at least one leading wheel rotatable about a leading-wheel axis and (b) a wheel linkage at the leading-wheel axis. The distal end of the leading suspension arm is rotatably attached to the wheel linkage at a wheel offset axis offset from the leading-wheel axis and the second end of the tensioning element is rotatably attached to the wheel linkage at a distal tensioning pivot offset from the leading-wheel axis. Also, the tensioning axes is angularly displaced therearound such that the wheel linkage is a class 2 lever with the wheel offset axis being the fulcrum thereof. In some of these embodiments, the trailing-wheel assembly includes a trailing-wheel axis at the trailing-arm distal end and at least one trailing wheel rotatable about the trailing-wheel axis.

In some highly-preferred embodiments, the rotatable attachments of the leading and trailing suspension elements at the rearward and forward suspension ends, respectively, are configured to permit rotation having at least two degrees-of-freedom and the rearward and forward rotatable bogie-mount connections are configured to permit rotation having at least two degrees-of-freedom.

In certain highly-preferred embodiments, the rotatable attachments of the first and second ends of the tensioning element are configured to permit rotation having at least two degrees-of-freedom.

In certain highly-preferred embodiments, the leading and trailing suspension elements include gas-filled components to provide spring force. In some of these embodiments, the leading and trailing suspension elements further include hydraulic piston and cylinder components. Also, in some of these embodiments, the leading and trailing suspension elements are on a common hydraulic circuit. And some of these embodiments further include an external accumulator hydraulically connected to the common hydraulic circuit.

In certain embodiments of the inventive vehicle track-module apparatus, the leading and trailing wheels have equal diameters, and in some embodiments, the bogie wheels have equal diameters.

In another aspect of the invention, the leading wheel(s) are leading idler wheel(s), the trailing wheel(s) are trailing idler wheel(s), the drive wheel is positioned above and between the idler wheels, the leading-wheel assembly is a leading-idler assembly, and the trailing-wheel assembly is a trailing-idler assembly.

Some embodiments of the inventive track-module apparatus are configured such that the drive wheel is driven by a driving mechanism configured to be powered by the vehicle, and in some of these embodiments, the driving mechanism is a gearbox attachable to a driven axle of a vehicle.

Some embodiments of the inventive vehicle track-module apparatus include a tensioning element having first and second ends with the first end rotatably attached to the trailing suspension arm at a proximal tensioning pivot between the trailing-arm distal end and the trailing arm axis. In these embodiments, the trailing-wheel assembly includes (a) at least one trailing wheel rotatable about a trailing-wheel axis and (b) and a wheel linkage at the trailing-wheel axis. The distal end of the trailing suspension arm is rotatably attached to the wheel linkage at a wheel offset axis offset from the trailing-wheel axis; the second end of the tensioning element is rotatably attached to the wheel linkage at a distal tensioning pivot which is offset from the trailing-wheel axis; and the distal tensioning pivot and the wheel offset axis are angularly displaced around the trailing-wheel axis such that wheel linkage is a class 2 lever with the wheel offset axis being the fulcrum thereof. In some of these embodiments, the leading-wheel assembly includes a leading-wheel axis at the leading-arm distal end and at least one leading wheel rotatable about the leading-wheel axis.

BRIEF DESCRIPTION OF THE DRAWINGS

FIG. 5 is side-elevation drawing of portions of the embodiment of the vehicle track-module apparatus of FIGS. 1A and 1B, showing the suspension linkage components without the drive wheel and the endless track and wheels.

FIG. 7A shows the track-module apparatus just prior to encountering the bump.

FIG. 7B shows the track-module apparatus with its leading idler wheels over the bump.

FIG. 7C shows the track-module apparatus with its leading bogie wheels over the bump.

FIG. 7D shows the track-module apparatus with its middle bogie wheels over the bump.

FIG. 7E shows the track-module apparatus with its trailing bogie wheels over the bump.

FIG. 7F shows the track-module apparatus with its trailing idler wheels over the bump.

FIG. 16 is a table of reference numbers for the components and other things illustrated in FIGS. 1A-15C and 17A-18 and for the forces represented in the drawings.

FIG. 17A is a table of dimensions for an exemplary track-module apparatus.

FIG. 17B is a set of five tables illustrating five different sets of loads on the exemplary apparatus of FIG. 17A and the five resulting load distributions.

DETAILED DESCRIPTIONS OF PREFERRED EMBODIMENTS

Figure 1A:
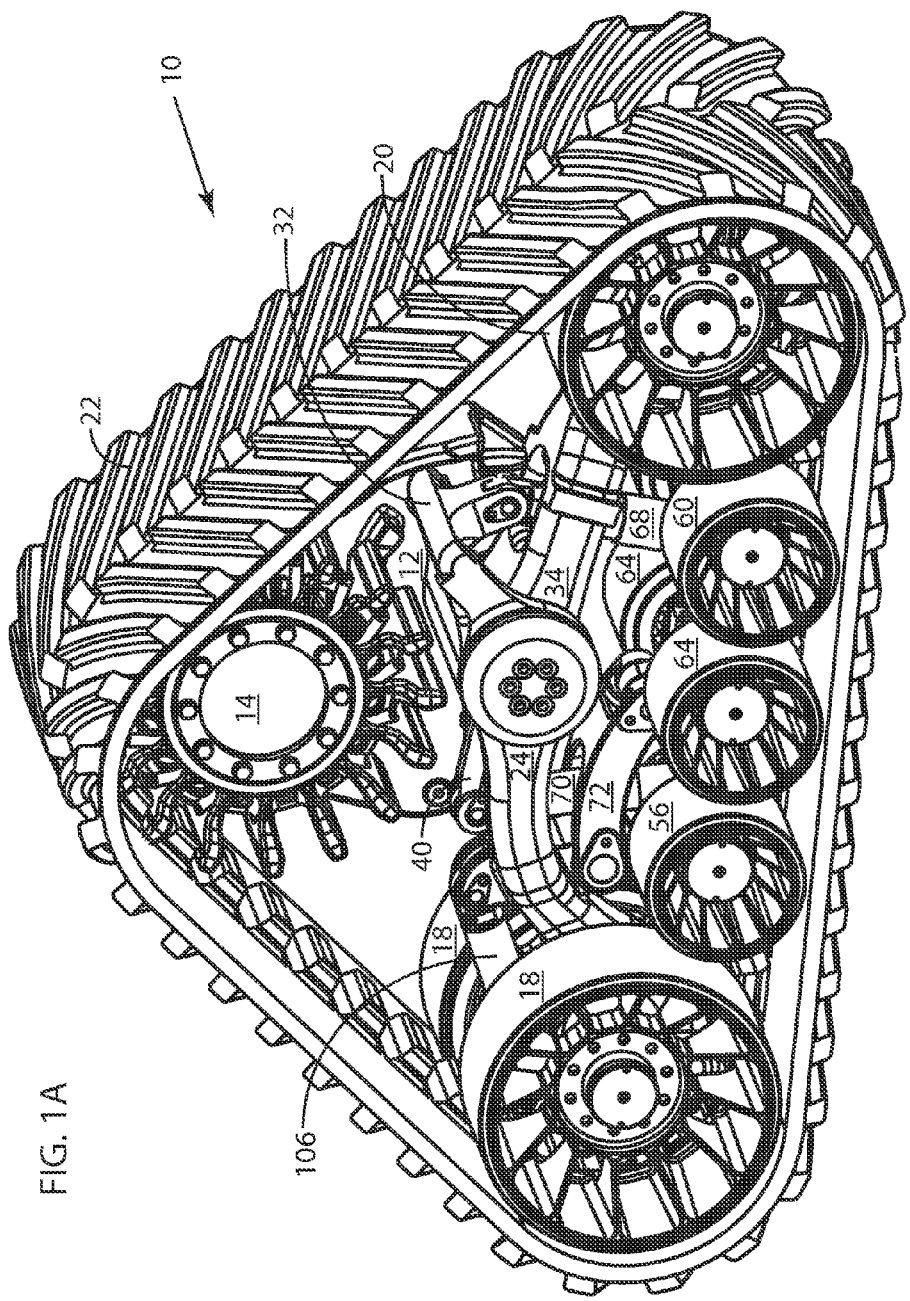
FIG. 1A is a perspective drawing of an embodiment of the vehicle track-module apparatus of this invention.

FIG. 1A is a perspective drawing of an embodiment 10 of the vehicle track-module apparatus of this invention. (As referred to herein, an embodiment of a track-module apparatus and the track-module apparatus itself may be referred to using the same reference number. Thus, for example, "embodiment 10" and "track-module apparatus 10" refer to the same apparatus.) Embodiment 10 includes a module frame 12, a drive wheel 14 which is rotatable with respect to frame 12, the drive wheel having a drive wheel axis 16, ground-engaging leading wheels 18 and ground-engaging trailing wheels 20 and ground-engaging bogie wheels 56, 60 and 64, and an endless track 22 which extends around wheels 14, 18, 20, 56, 60 and 64 and is driven by its engagement with drive wheel 14.

Figure 1B:
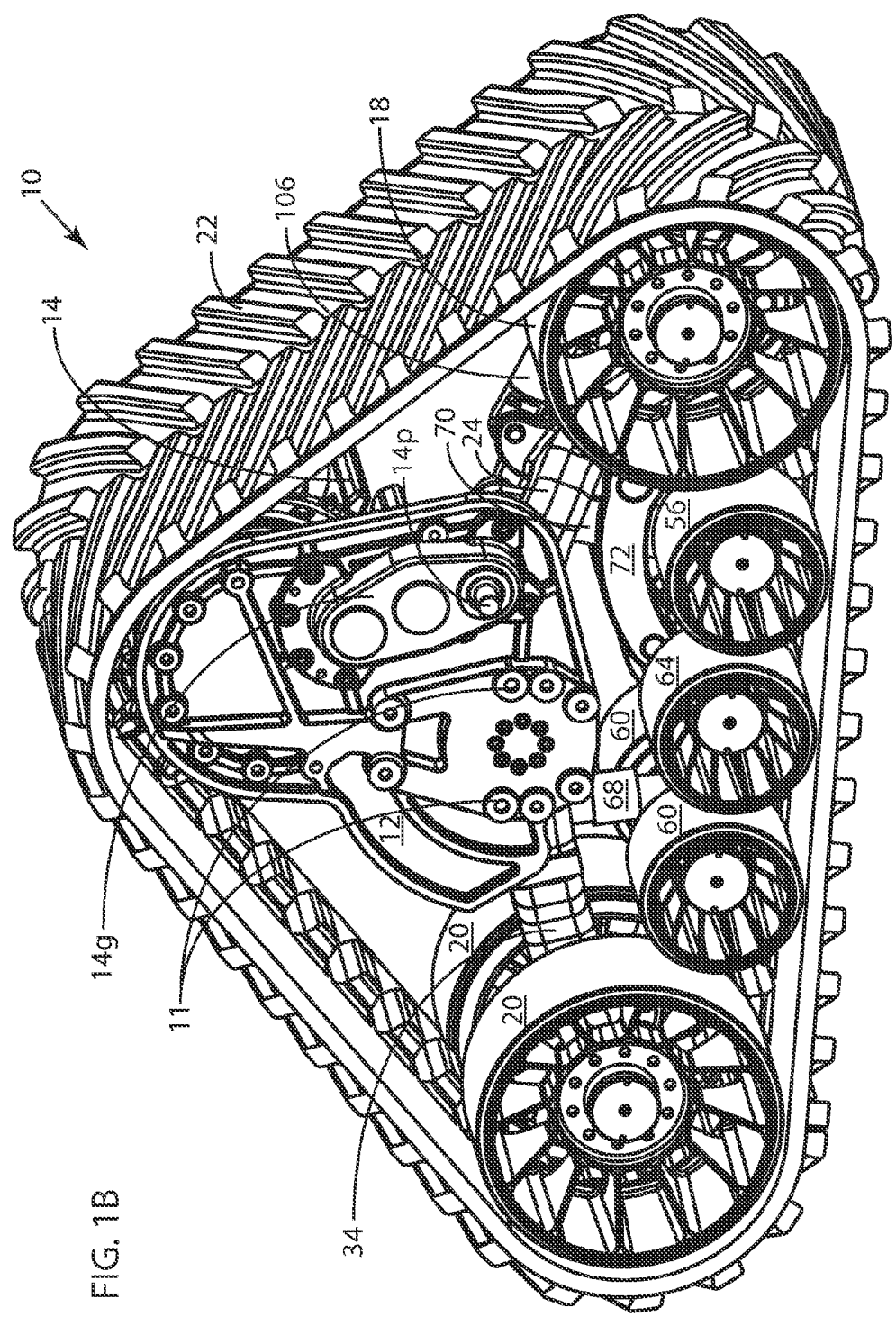
FIG. 1B is a perspective drawing of the embodiment of FIG. 1A as viewed from the side opposite that shown in FIG. 1A.

FIG. 1B is a perspective drawing of track-module apparatus 10 of FIG. 1A as viewed from the side opposite that shown in FIG. 1A. Referring to FIG. 1B, track-module apparatus 10 includes a vehicle connection 11 at which track-module apparatus 10 is attached to a vehicle and a drive gearbox 14g which receives power from the vehicle through a drive power input shaft 14p.

In embodiment 10, leading wheels 18 are leading idler wheels 18, and trailing wheels 20 are trailing idler wheels 20.

In some embodiments of the inventive track-module apparatus, it is contemplated that a leading or trailing wheel may also function as the drive wheel. Also in embodiment 10, endless track 22 is an endless polymeric track 22. It is contemplated that within the scope of the present invention, endless track 22 may be constructed of a wide variety of materials and structures including metallic components such as are presently known in some tracked vehicles. The specific properties and materials of the endless track are not central to the inventive concepts of the present invention.

Bogie wheels 56 are leading bogie wheels, bogie wheels 60 are trailing bogie wheels, and bogie wheels 64 are middle bogie wheels. Bogie wheels 56, 60 and 64 are part of a bogie assembly 46. Embodiment 10 also includes a leading suspension arm 24, a trailing suspension arm 34, a leading suspension element 68, a trailing suspension element 70, and a tensioning element 106.

Figure 4:
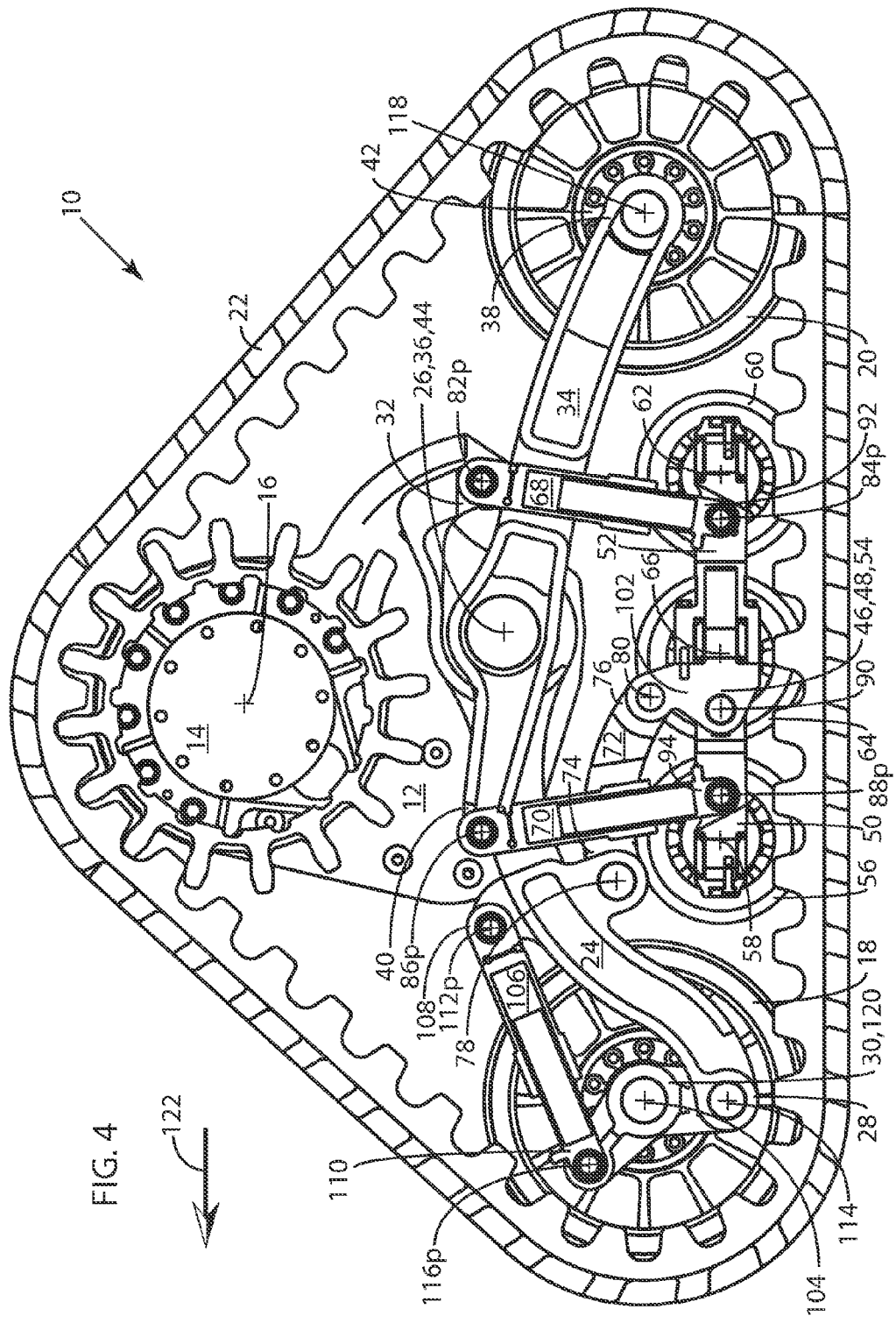
FIG. 4 is a side-elevation drawing of the embodiment of FIGS. 1A and 1B with the near set of idler and bogie wheels removed to show the linkages.

The direction of forward travel of the track module of embodiment 10 (and other similar embodiments presented herein) is defined by leading idler wheels 18 being ahead of trailing idler wheels 20. FIG. 4 includes an arrow 122 indicating the direction of travel applicable to all embodiments as defined by the leading and trailing components of the embodiments.

Figure 2:
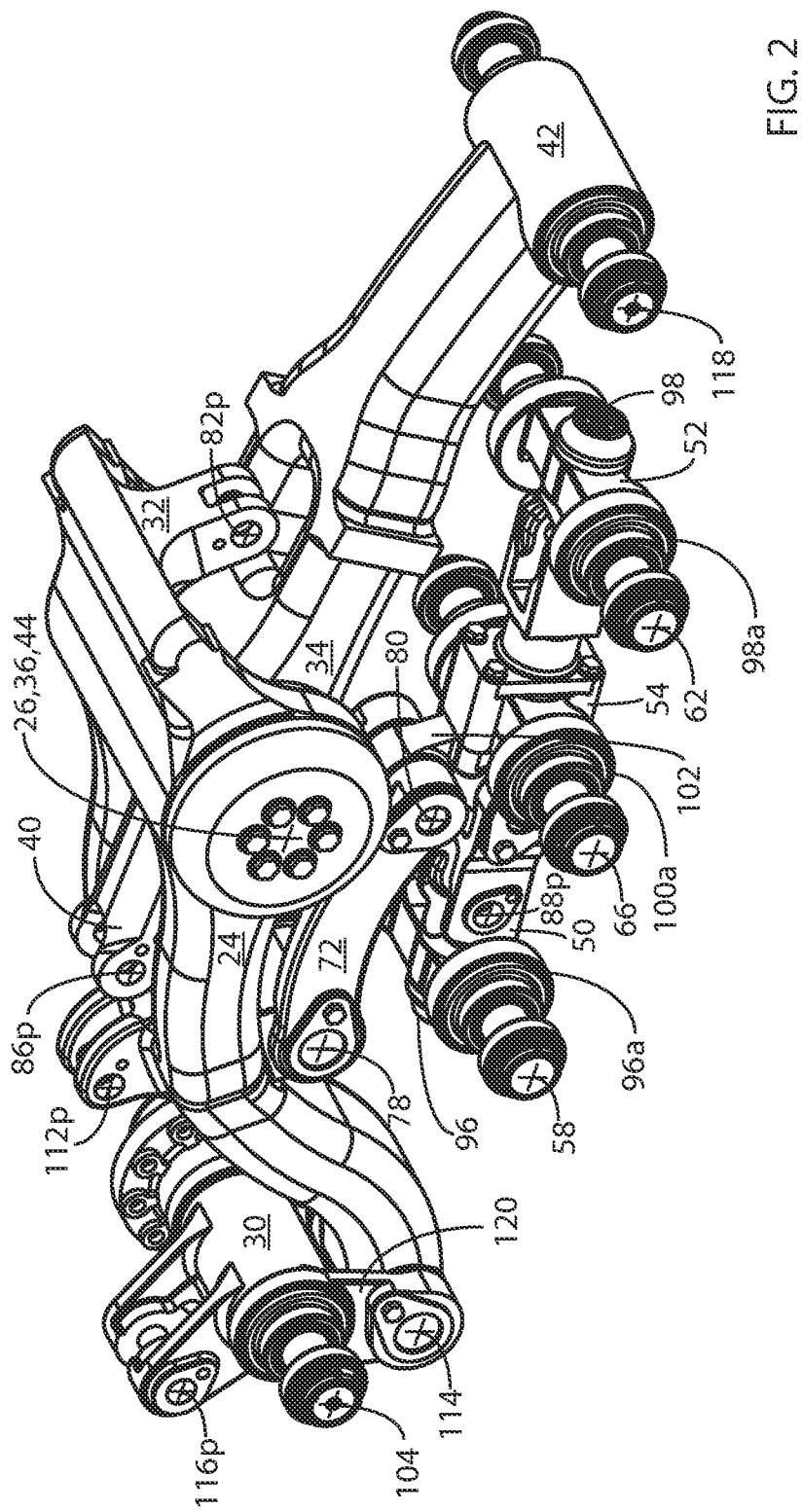
FIG. 2 is a perspective drawing of portions of the embodiment of the vehicle track-module apparatus of FIGS. 1A and 1B, illustrating the suspension linkage components without the drive wheel, endless polymeric track, wheels, frame and suspension elements.
Figure 3:
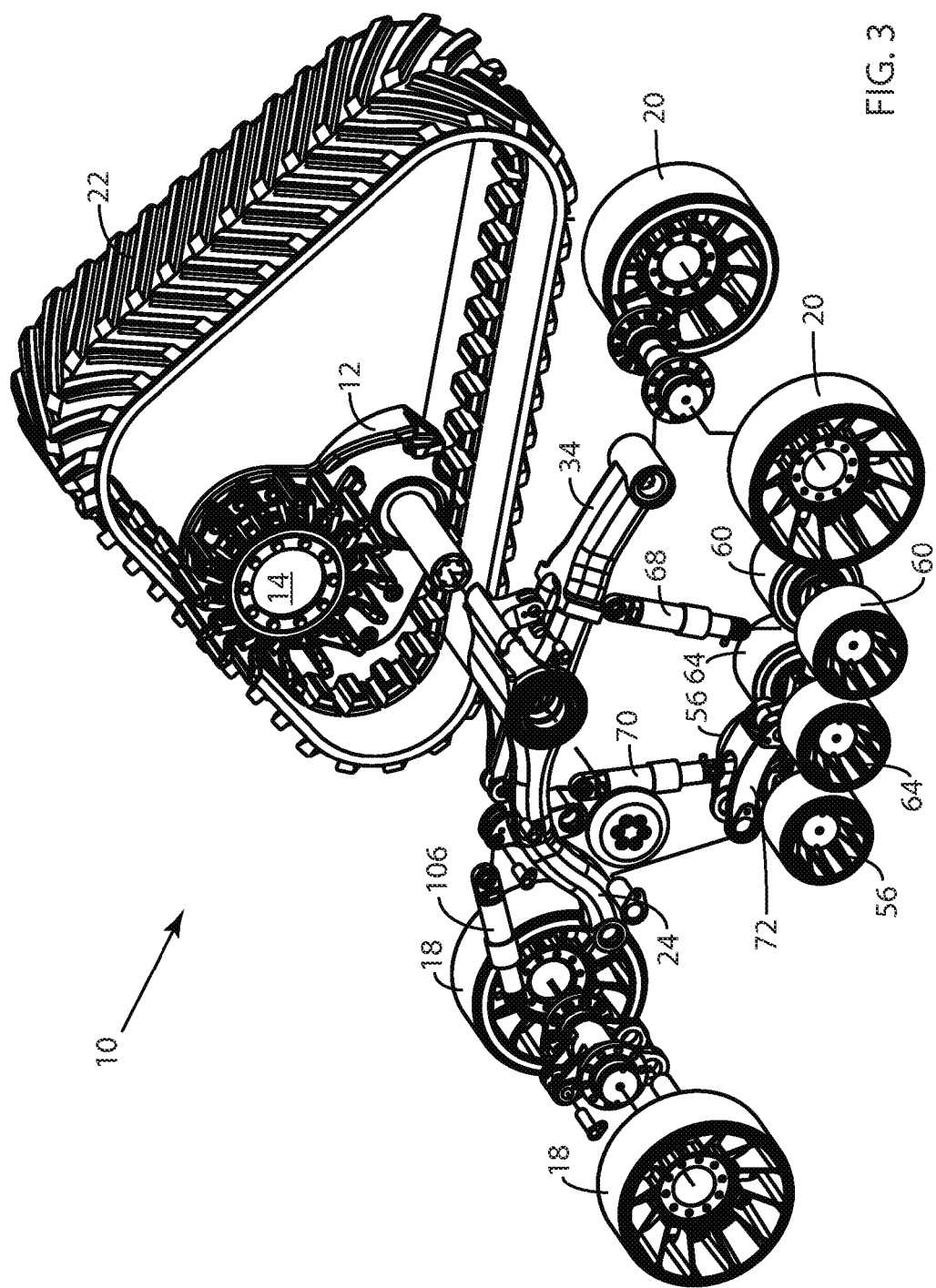
FIG. 3 is an exploded perspective drawing of the embodiment of FIGS. 1A and 1B.

FIGS. 2 through 6B illustrate track-module apparatus 10 and various partial assemblies thereof in several views in order to show more clearly the various aspects of inventive track-module apparatus 10. FIG. 2 is a perspective drawing of portions of track-module apparatus 10, illustrating the several suspension linkage components without drive wheel 14, track 22, leading idler wheels 18, trailing idler wheels 20, leading bogie wheels 56, trailing bogie wheels 60, middle bogie wheels 64, frame 12, leading suspension element 68, trailing suspension element 70, and tensioning element 106. FIG. 3 is an exploded perspective drawing of track-module apparatus 10.

FIG. 4 is a side-elevation drawing of track-module apparatus 10 with the near (in the drawing) set of idler wheels 18 and 20 and bogie wheels 56, 60 and 64 removed to show the various elements of embodiment 10 more clearly.

FIG. 5 is side-elevation drawing of portions of vehicle track-module apparatus 10. Similar to FIG. 2, FIG. 5 illustrates various components of apparatus 10 with some components not shown to increase the visibility of other components.

Figure 6A:
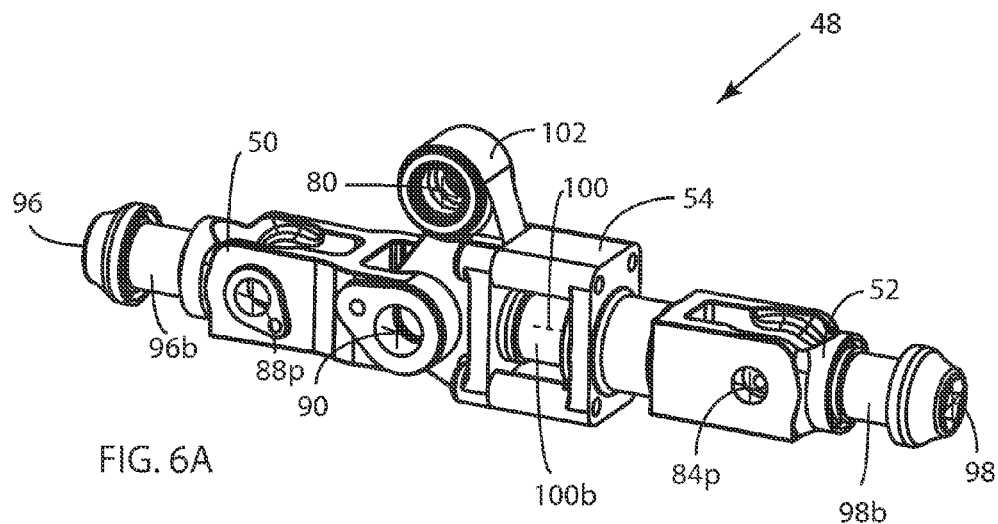
FIG. 6A is a perspective drawing of the bogie mount portions of the bogie assembly of the vehicle track-module apparatus of FIGS. 1A and 1B.
Figure 6B:
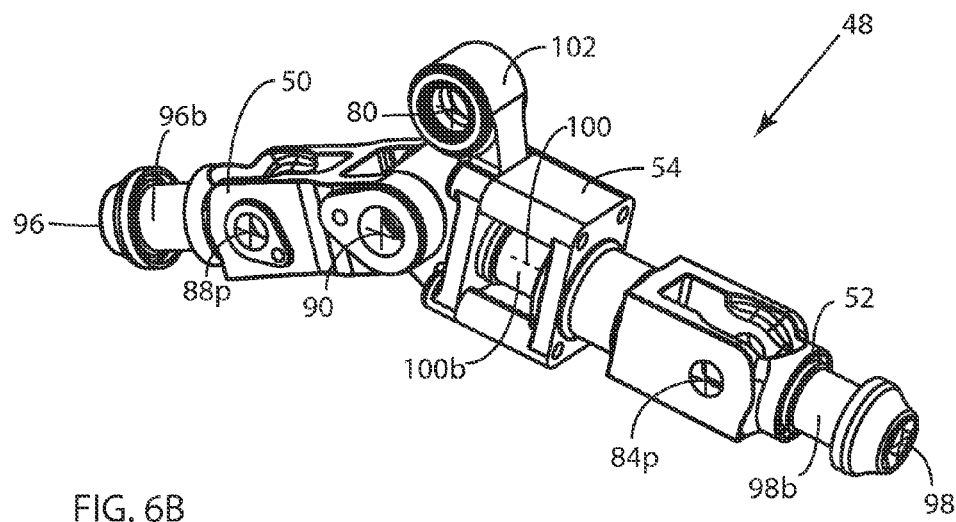
FIG. 6B is a perspective drawing of the bogie mount of FIG. 6A showing the bogie-mount forward portion rotated with respect to the bogie-mount rearward portion around the third bogie-assembly axis.

FIGS. 6A and 6B are perspective drawings of the bogie mount portions of bogie assembly 46 of vehicle track-module apparatus 10 without bogie wheels 56, 60 and 64. FIG. 6A illustrates bogie mount 48 oriented as if apparatus 10 were on a flat portion of the ground. FIG. 6B illustrates bogie mount 48 as if apparatus 10 were on uneven ground to illustrate some of the degrees-of-freedom available in the configuration of bogie mount 48 of bogie assembly 46. Further description is presented below in this document.

The following description of track-module apparatus 10 (and later of other embodiments) refers to FIGS. 1A-6B together. Note that in all of the drawings, a "+" symbol is used to indicate an axis of rotation. In general, as used herein, the term "axis" as stated above pertains to a pivot joint which includes the necessary bearing structure and other components to permit rotation about such axis. As an example, drive wheel axis 16 about which drive wheel 14 rotates is indicated in FIG. 4 by a "+" symbol. Portions of axle and bearing structure (not shown) which are needed for drive wheel 14 to rotate around axis 16 are assumed to be part of embodiment 10.

In six instances within apparatus 10, the "+" symbol indicates a pivot joint which may provide more than one degree-of-freedom of relative motion. This is indicated by (a) the name including the word "pivot" rather than "axis" and (b) the relevant reference number ending with the letter "p". These instances are 82p, 84p, 86p, 88p, 112p and 116p. As described later in this document, such higher number of degrees-of-freedom of relative motion may be provided by the use of spherical bearings. It should be understood that it is intended that in some embodiments, such "pivots" may also simply be axes configured for single degree-of-freedom rotation. The use of the term "pivot" is not intended to limit the scope of the present invention to multiple degrees-of-freedom motion at such locations within embodiments having such pivots. Acceptable components necessary to provide the required number of degrees-of-freedom are well-known to those skilled in the mechanical arts.

Leading suspension arm 24 is rotatably attached to frame 12 at a leading arm axis 26 and extends forward to a leading-arm distal end 28 at which a leading-wheel assembly 30 is rotatably attached. In apparatus 10, leading-wheel assembly 30 is also called leading-idler assembly 30 since in apparatus 10, leading wheel 18 is leading idler wheel 18. Leading suspension arm 24 extends rearwardly to a rearward suspension end 32. In similar fashion, trailing suspension arm 34 is rotatably attached to frame 12 at a trailing arm axis 36 and extends rearward to a trailing-arm distal end 38 at which a trailing-wheel assembly 42 is attached. In apparatus 10, trailing-wheel assembly 42 is also called trailing-idler assembly 42 since in apparatus 10, trailing wheel 20 is trailing idler wheel 20.

In embodiment 10, trailing-idler assembly 42 primarily comprises trailing idler wheels 20 which are rotatably attached at a trailing-idler axis 118. Trailing suspension arm 34 extends forwardly to a forward suspension end 40. In embodiment 10, leading arm axis and trailing arm axis 36 are coincident and together form suspension-arm axis 44. Such coincidence is not intended to be limiting; other configurations of the inventive track-module apparatus in which leading arm axis 26 and trailing arm axis 36 are not coincident are contemplated within the scope of this invention.

Suspension-arm axis 44 of embodiment 10 is shown as being rearward of and below drive wheel axis 16 as defined by direction-of-travel arrow 122 in FIG. 4. Such relative positioning with respect to drive wheel axis 16 is not intended to be limiting; other relative positions of leading arm axis 26 and trailing arm axis 36 are contemplated within the scope of this invention.

Bogie assembly 46 includes two leading bogie wheels 56, two middle bogie wheels 64, and two trailing bogie wheels 60. Bogie assembly 46 also includes a bogie mount 48 which includes bogie-mount forward portion 50, a bogie-mount middle portion 54, a bogie-mount rearward portion 52, and a bogie-mount arm 102. Leading bogie wheels 56 are rotatable with respect to bogie-mount forward portion 50 around a leading bogie axis 58. In addition, leading bogie axis 58 rotates through a limited range of angles about a leading bogie roll axis 96 which is perpendicular to leading bogie axis 58.

In a similar fashion, such relative rotational movement is also provided for middle bogie wheels 64 and trailing bogie wheels 60. Middle bogie wheels 64 are rotatable with respect to bogie-mount middle portion 54 around a middle bogie axis 66. Middle bogie axis 66 rotates through a limited range of angles about a middle bogie roll axis 100 which is perpendicular to middle bogie axis 66. Trailing bogie wheels 60 are rotatable with respect to bogie-mount rearward portion 52 around a trailing bogie axis 62. Trailing bogie axis 62 rotates through a limited range of angles about a trailing bogie roll axis 98 which is perpendicular to trailing bogie axis 62.

Bogie mount 48 also includes bearings 96b, 100b and 98b, configured as follows: (1) bearing 96b at leading bogie roll axis 96; (2) bearing 100b at middle bogie roll axis 100; and (3) bearing 98b at trailing bogie roll axis 98. Bogie assembly 46 also includes a leading bogie axle assembly 96a to which leading bogie wheels 56 are rotatably attached, a middle bogie axle assembly 100a to which middle bogie wheels 64 are rotatably attached, and a trailing bogie axle assembly 98a to which trailing bogie wheels 60 are rotatably attached. Bearings 96b, 100b and 98b are configured to permit bogie axle assemblies 96a, 100a and 98a, respectively, to rotate on such bearings around leading bogie roll axis 96, middle bogie roll axis 100 and trailing bogie roll axis 98, respectively. Leading bogie roll axis 96 and trailing bogie roll axis 98 are indicated at respective ends of bogie mount 48 in FIGS. 6A and 6B. Also in FIGS. 6A and 6B, middle bogie roll axis 100 is indicated by dotted lines at middle bogie roll axis bearing 100b but should be understood to be located internally in the center of bearing 100b, parallel to such dotted lines and not on the surface of bearing 100b.

Bogie mount 48 of bogie assembly 46 is rotatably attached at a first bogie-assembly axis 78 to leading suspension arm 24 at a location along arm 24 between leading arm axis 26 and leading-arm distal end 28 by a bogie-assembly arm 72 at a bogie-assembly arm distal end 74. Bogie-assembly arm 72 also includes a bogie-assembly arm proximal end 76 which is rotatably attached to a bogie-mount arm 102 of bogie mount 48 at a second-bogie-assembly axis 80.

Bogie mount 48 of bogie assembly 46 is also attached to leading suspension arm 24 and trailing suspension arm 34 by suspension elements 68 and 70. Leading suspension element 68 is rotatably attached to rearward suspension end 32 of leading suspension arm 24 at a leading suspension-element pivot 82p and is rotatably attached to bogie-mount rearward portion 52 at a first bogie-assembly pivot 84p at a rearward bogie-mount connection 92. Trailing suspension element 70 is rotatably attached to forward suspension end 40 of trailing suspension arm 34 at trailing suspension-element pivot 86p and is rotatably attached to bogie-mount forward portion 50 at a second bogie-assembly pivot 88p at a forward bogie-mount connection 94.

Within bogie mount 48 of bogie assembly 46 in track-module apparatus 10, bogie-mount forward portion 50 and bogie-mount middle portion 54 are rotatably attached at a third bogie-assembly axis 90.

Embodiment 10 includes a tensioning element 106 which provides attachment between leading suspension arm 24 and leading-idler assembly 30. Leading-idler assembly 30 includes leading idler wheels 18 and a leading-idler axis 104 about which leading idler wheels 18 rotate. Leading-idler assembly 30 also includes a wheel linkage 120 at leading-idler axis 104; in apparatus 10, wheel linkage 120 is idler linkage 120. Leading-arm distal end 28 is rotatably attached to idler linkage 120 at an idler offset axis 114 which is offset from leading-idler axis 104.

A tensioning-element first end 108 of tensioning element 106 is rotatably attached to leading suspension arm 24 at a proximal tensioning pivot 112p at forward suspension end 40 between leading-arm distal end 28 and suspension-arm axis 44. A tensioning-element second end 110 is rotatably attached to leading-idler assembly 30 at a distal tensioning pivot 116p offset from leading-idler axis 104. Idler offset axis 114 is parallel to leading-idler axis 104 and angularly displaced therearound such that idler linkage 120 is a class 2 lever with idler offset axis 114 being the fulcrum thereof.

Tension forces on track 22 are provided through idler wheels 18 by tensioning element 106 through the class 2 lever action of idler linkage 120 acted on by tensioning element 106.

Suspension elements 68 and 70 and tensioning element 106 may provide both spring and damping forces. In some embodiments, such elements may be gas-filled and include a liquid-filled cavity to provide both types of forces for the suspension system. Such elements are well-known to those skilled in the art of vehicle suspension. Further description of suspension elements 68 and 70 is provided in the description of FIG. 9.

Figure 7A:
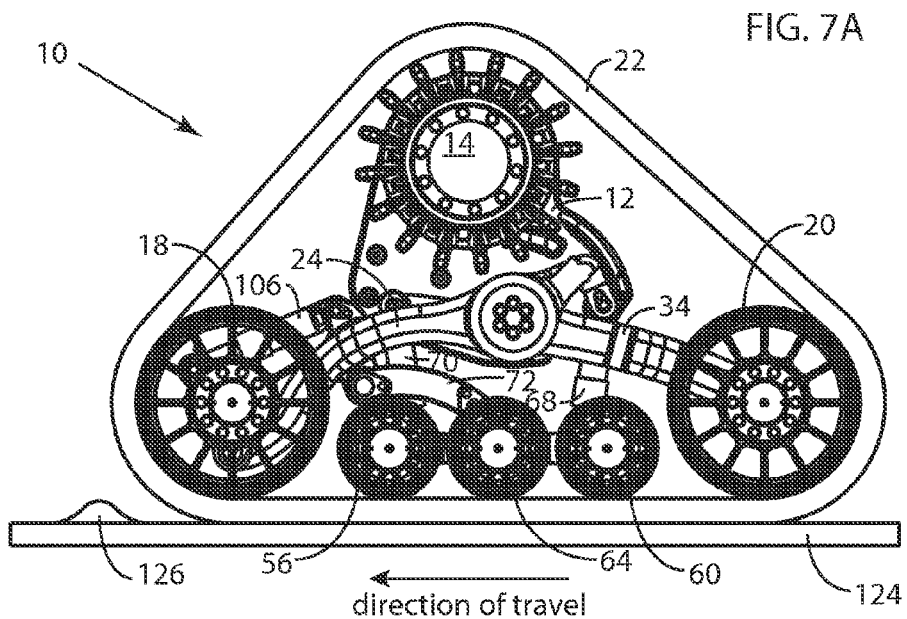
FIGS. 7A-7F are side-elevation drawings of the embodiment of FIGS. 1A and 1B illustrating the movement of the inventive vehicle track-module apparatus as it traverses over a small bump along its path of travel.
Figure 7B:
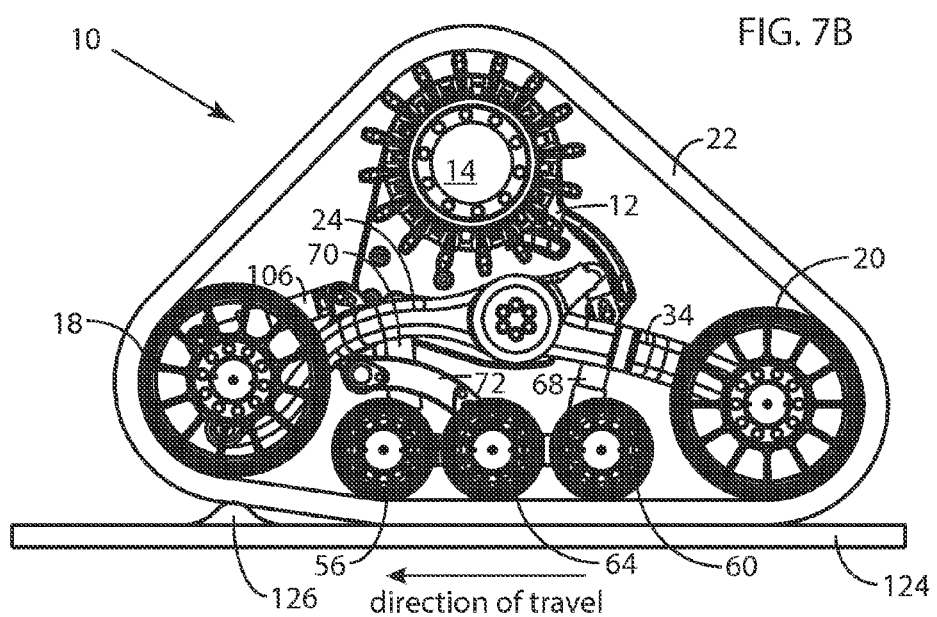
Figure 7C:
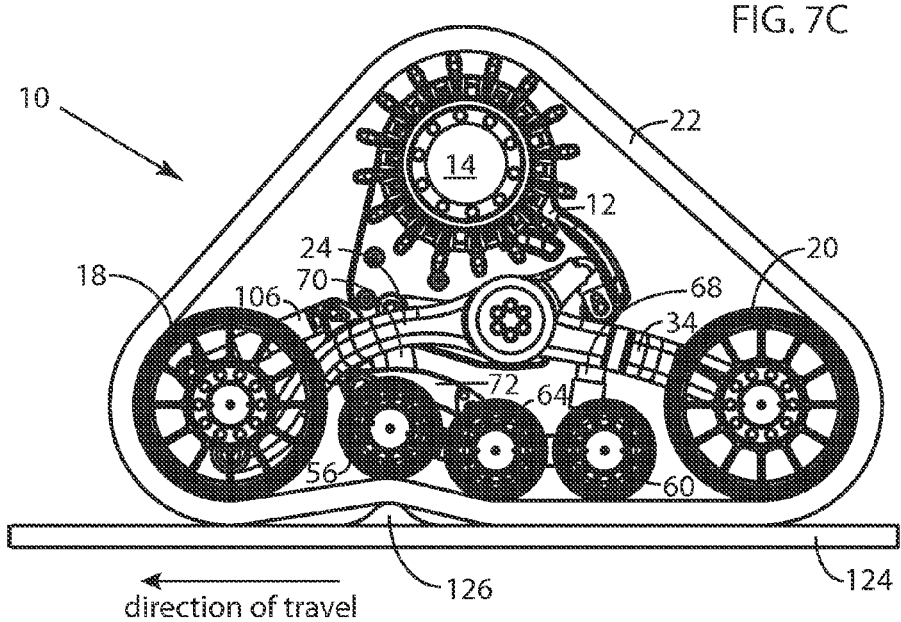
Figure 7D:
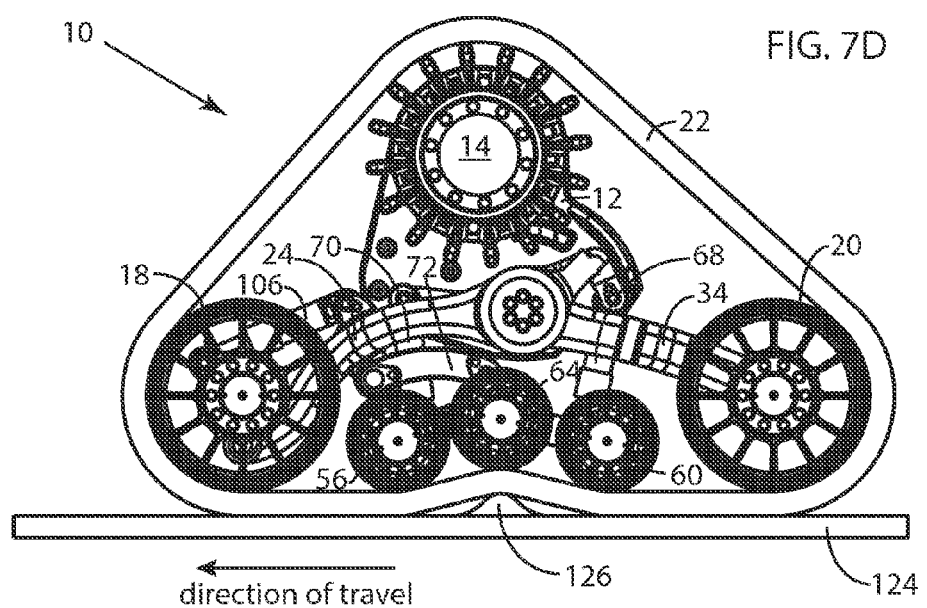
Figure 7E:
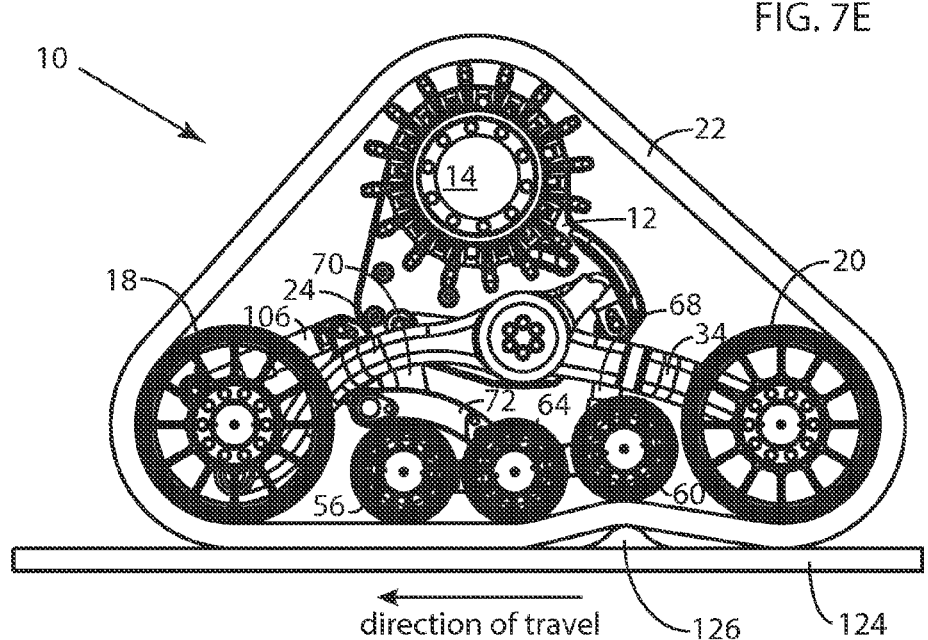
Figure 7F:
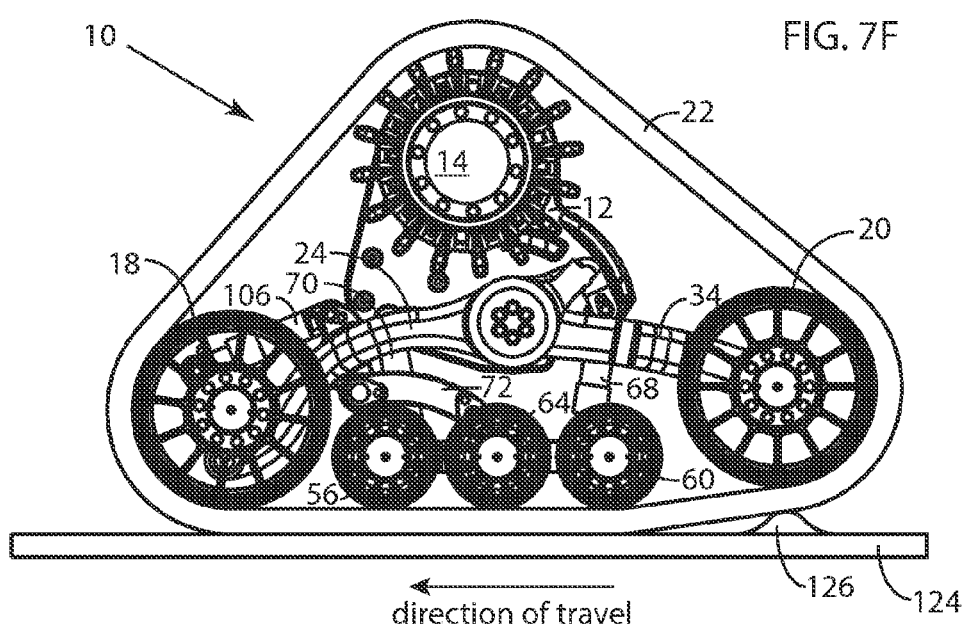

FIGS. 7A through 8B illustrate the kinematics of track-module apparatus 10 under various operating conditions. Each such drawing is a side-elevation illustration of apparatus 10 under representative conditions to show the relative movement of the components of apparatus 10 under such conditions. FIGS. 7A-7F illustrate the movement of vehicle track-module apparatus 10 as it traverses over a small bump 126 on the ground 124 along its path of travel. FIG. 7A shows track-module apparatus 10 just prior to encountering bump 126. FIG. 7B shows apparatus 10 with its leading idler wheels 18 over bump 126. FIG. 7C shows apparatus 10 with leading bogie wheels 18 over bump 126. FIG. 7D shows apparatus 10 with middle bogie wheels 64 over bump 126. FIG. 7E shows apparatus 10 with trailing bogie wheels 60 over bump 126. FIG. 7F shows apparatus 10 with trailing idler wheels 20 over bump 126.

Figure 8A:
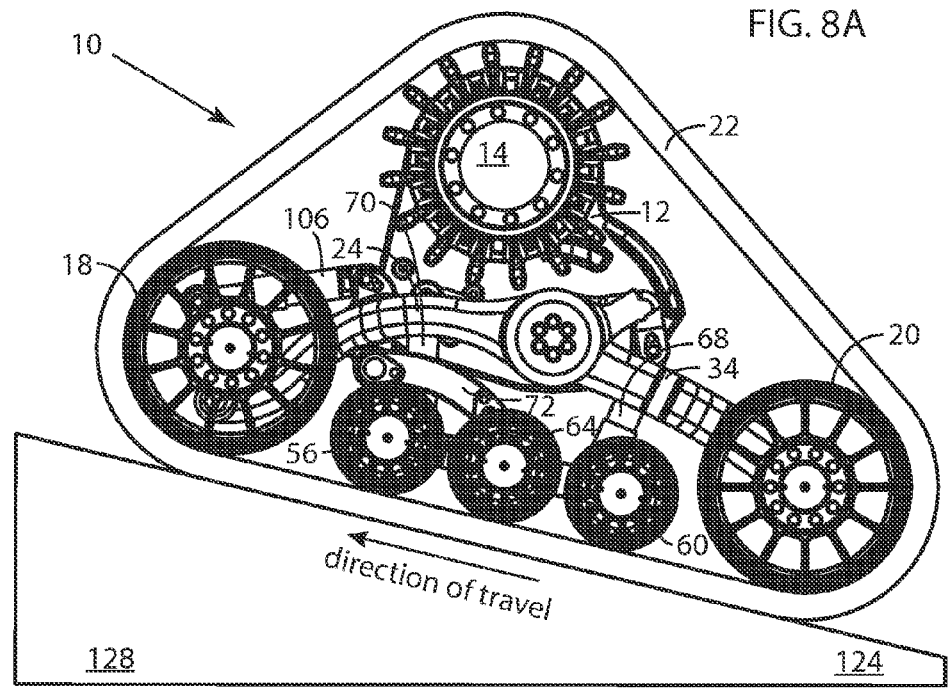
FIG. 8A is a side-elevation drawing of the embodiment of FIGS. 1A and 1B illustrating the movement of the inventive vehicle track-module apparatus as it traverses an uphill path.
Figure 8B:
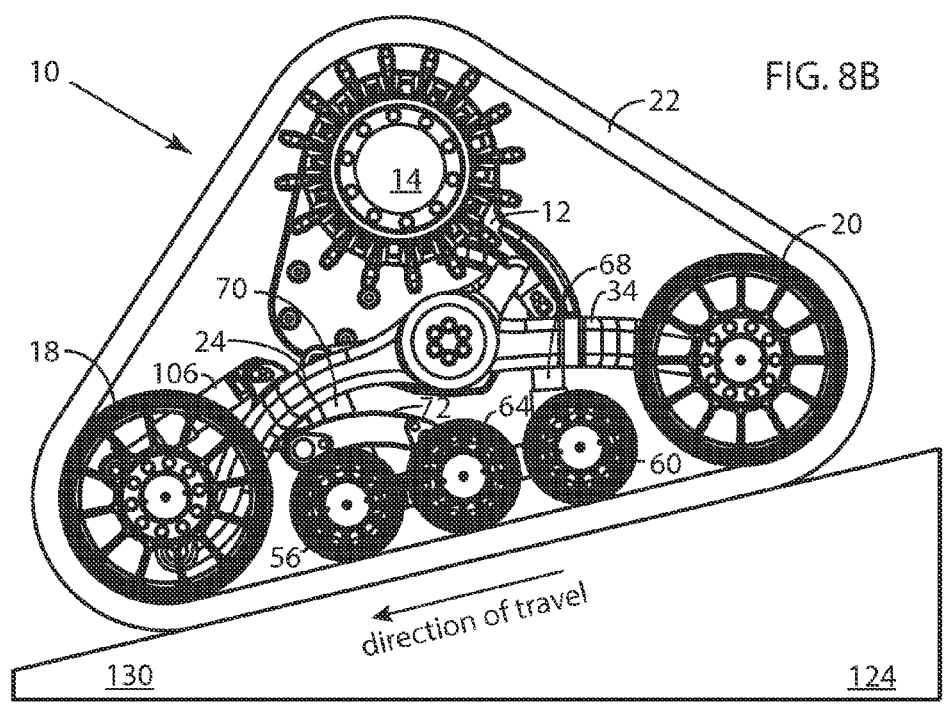
FIG. 8B is a side-elevation drawing of the embodiment of FIGS. 1A and 1B illustrating the movement of the inventive vehicle track-module apparatus as it traverses a downhill path.

FIG. 8A is a side-elevation drawing of track-module apparatus 10 illustrating apparatus 10 as it traverses an uphill portion 128 of ground 124. Similarly, FIG. 8B is a side-elevation drawing of apparatus 10 illustrating apparatus 10 as it traverses a downhill portion 130 of ground 124. Each of the drawings of FIGS. 7A through 8B illustrate idler wheels 18 and 20 and bogie wheels 56, 60 and 64 all in contact with ground 124 in order to support some portion of the loads on apparatus 10.

Figure 9:
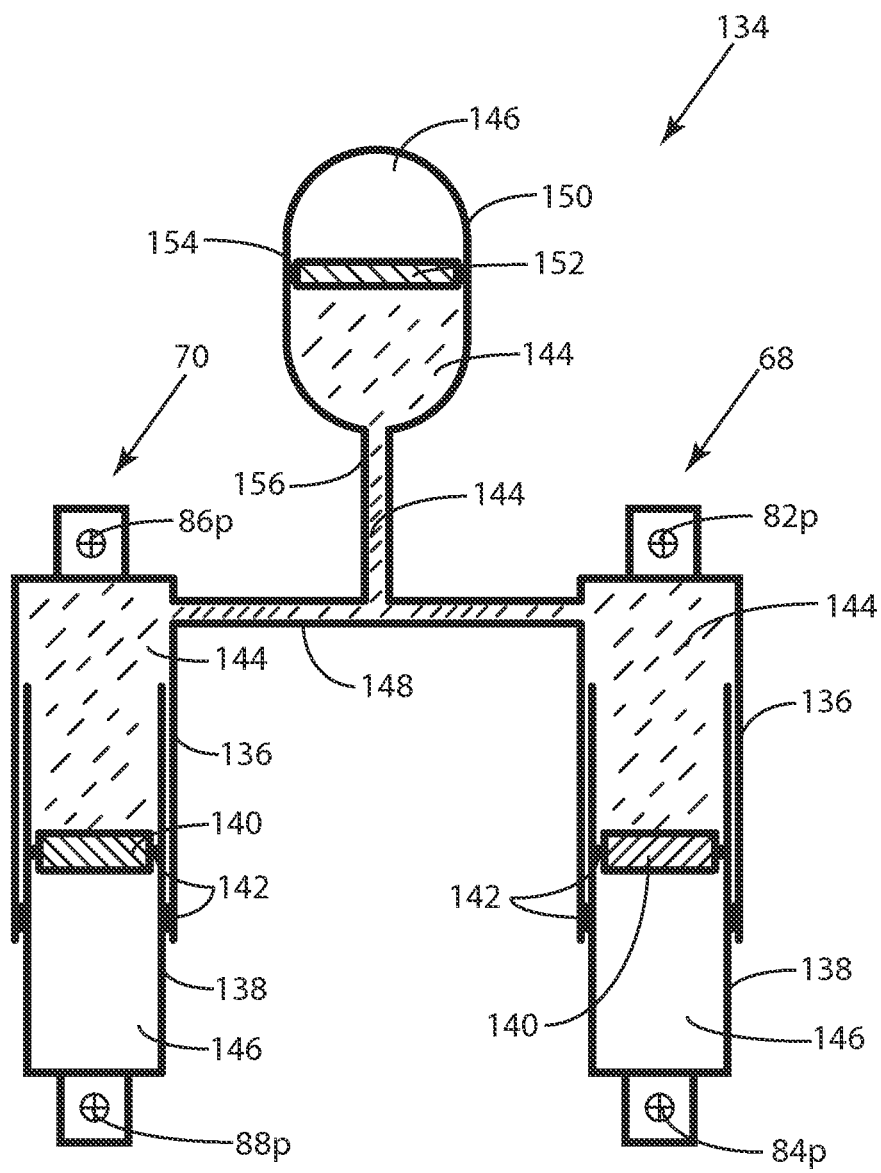
FIG. 9 is a schematic drawing of the leading and trailing suspension elements in a hydraulic circuit.

FIG. 9 is a schematic drawing of leading suspension element 68 and trailing suspension element 70 in a hydraulic circuit 134. Suspension elements 68 and 70 each include cylinders hydraulic 136 containing hydraulic fluid 144 and gas-filled cylinders 138 containing gas 146 separated by pistons 140. Hydraulic cylinders 136 and gas-filled cylinders 138 are movably sealed for relative movement by seals 142, and gas-filled cylinders 138 and pistons 140 are movably sealed for relative movement by another set of seals 142 such that the volumes of hydraulic fluid 144 and gas 146 may both change under loads which are applied across suspension elements 68 and 70. In such components, gas 146 is typically nitrogen but other gases may be used.

Hydraulic cylinders 136 are interconnected by a hydraulic conduit 148 placing suspension elements 68 and 70 in a common hydraulic circuit such that the pressures in suspension elements 68 and 70 are equal. Gas 146 in gas-filled cylinders 138 enables suspension elements 68 and 70 to provide spring forces to the suspension system of apparatus 10 while hydraulic fluid 144 flowing through hydraulic conduit 148 enables suspension elements 68 and 70 to provide damping forces to the suspension system of apparatus 10.

Hydraulic circuit 134 also includes an external accumulator 150 connected to hydraulic conduit 148 by an accumulator conduit 156. Accumulator 150 includes both hydraulic fluid 144 and gas 146 in sealed separation from one another by an accumulator piston 152 movably sealed within accumulator 150 by accumulator seal 154. Gas 146 within accumulator 150 provides additional spring force to the suspension system of apparatus 10 while hydraulic fluid 144 flowing through accumulator conduit 156 and hydraulic conduit 148 provides additional damping force to suspension system of apparatus 10.

Suspension elements 68 and 70 and tensioning element 106 may provide suspension forces which are variable. For example, the damping forces may depend on the direction of the movement (extension or contraction) of the element in order to provide a specific desired suspension performance.

The operation of the components of hydraulic circuit 134 are well-known to those skilled in mechanical systems. FIG. 9 is intended only to be schematic. For example, the functions of accumulator piston 152 and accumulator seal 154 may be provided by a membrane, a bladder or other similar component. In similar fashion, the components of suspension elements 68 and 70 may also be different from those described above while providing similar operation of suspension elements 68 and 70.

Figure 10:
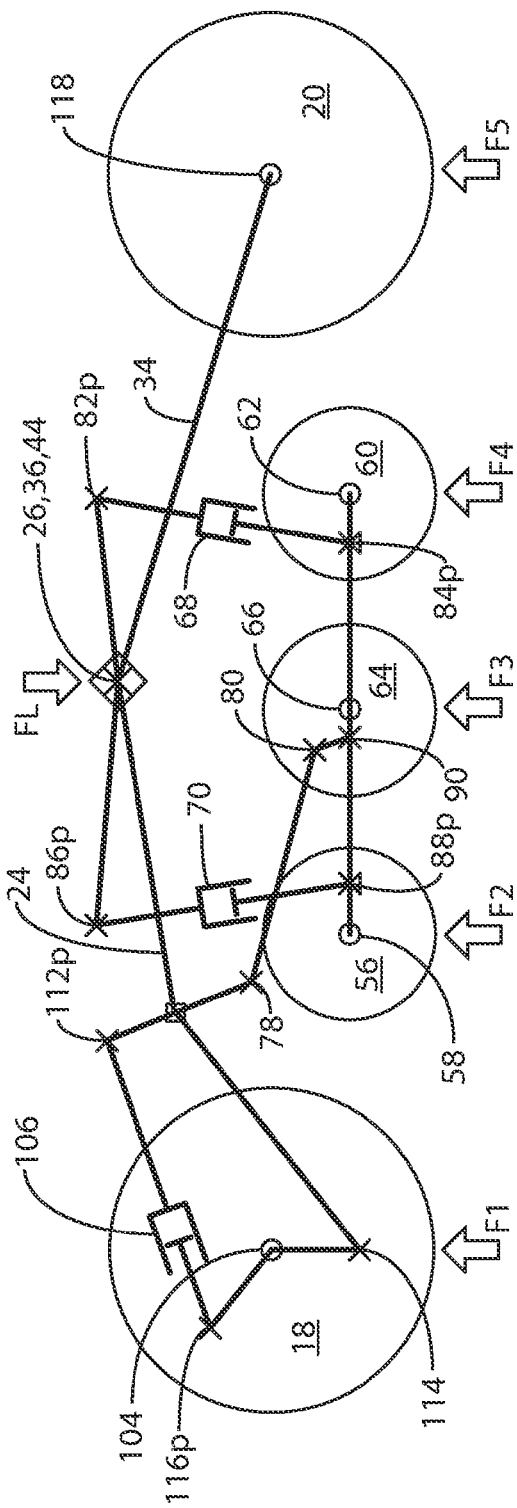
FIG. 10 is a schematic diagram of the embodiment of FIGS. 1A and 1B illustrating the supported load FL and the five resulting wheel loads F1 through F5.

FIG. 10 is a schematic diagram of the embodiment of FIGS. 1A and 1B, illustrating a supported load FL and a set of five resulting wheel loads F1 through F5. The load on leading wheels 18 is referred to as F1; the load on leading bogie wheels 56 is referred to as F2; the load on middle bogie wheels 64 is referred to as F3; the load on trailing bogie wheels 60 is referred to as F4; and the load on trailing wheels 20 is referred to as F5. Since all of supported load FL acts on suspension-arm axis 44, FIG. 10 shows FL at such location in the schematic diagram of FIG. 10.

The load FL supported by track-module apparatus 10 may have both vertical and horizontal components depending on the specific operational situation. These include at least the following: (a) the portion of the vehicle weight supported by apparatus 10; (b) pulling forces when the vehicle is pulling a load; and (c) braking forces which in an emergency braking situation may be quite high. Also, of course, each of the resulting forces F1 through F5 may also have both vertical and horizontal components, and all of these forces vary with the slope of the ground being traversed.

FIGS. 11 through 14 are side-elevation drawings (similar to FIG. 4) illustrating several alternative embodiments 10a through 10d, respectively, of the vehicle track-module apparatus of this invention. In each of FIGS. 11-14, the same reference numbers are used for components similar to those of track-module apparatus 10.

Figure 11:
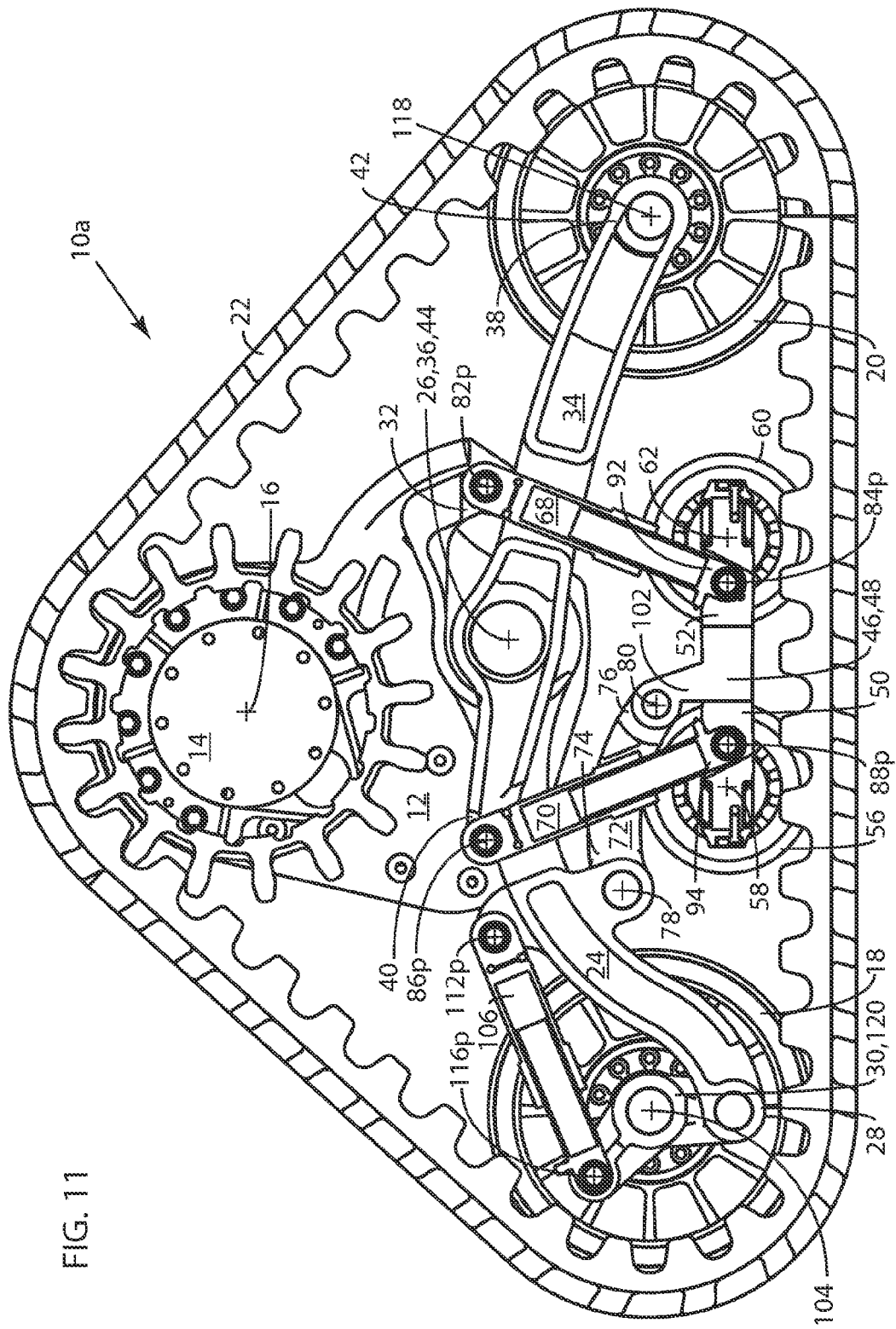
FIG. 11 is a side-elevation drawing (similar to FIG. 4) of a first alternative embodiment of the vehicle track-module apparatus of this invention. Such embodiment is similar to the embodiment of FIG. 4 but includes only leading and trailing bogie wheels with corresponding modifications to the components used in the suspension system.

FIG. 11 is a side-elevation drawing (similar to FIG. 4) of a first alternative embodiment 10a of the vehicle track-module apparatus of this invention. Embodiment 10a is similar to embodiment 10 except that middle bogie wheels 64 have been eliminated with corresponding changes in other components to accommodate such modification. A track module similar to first alternative embodiment 10a may be used to reduce complexity and cost when compared to embodiment 10 and/or may be used when the distance between the leading and trailing wheels needs to be shorter than is provided by embodiment 10.

Figure 12:
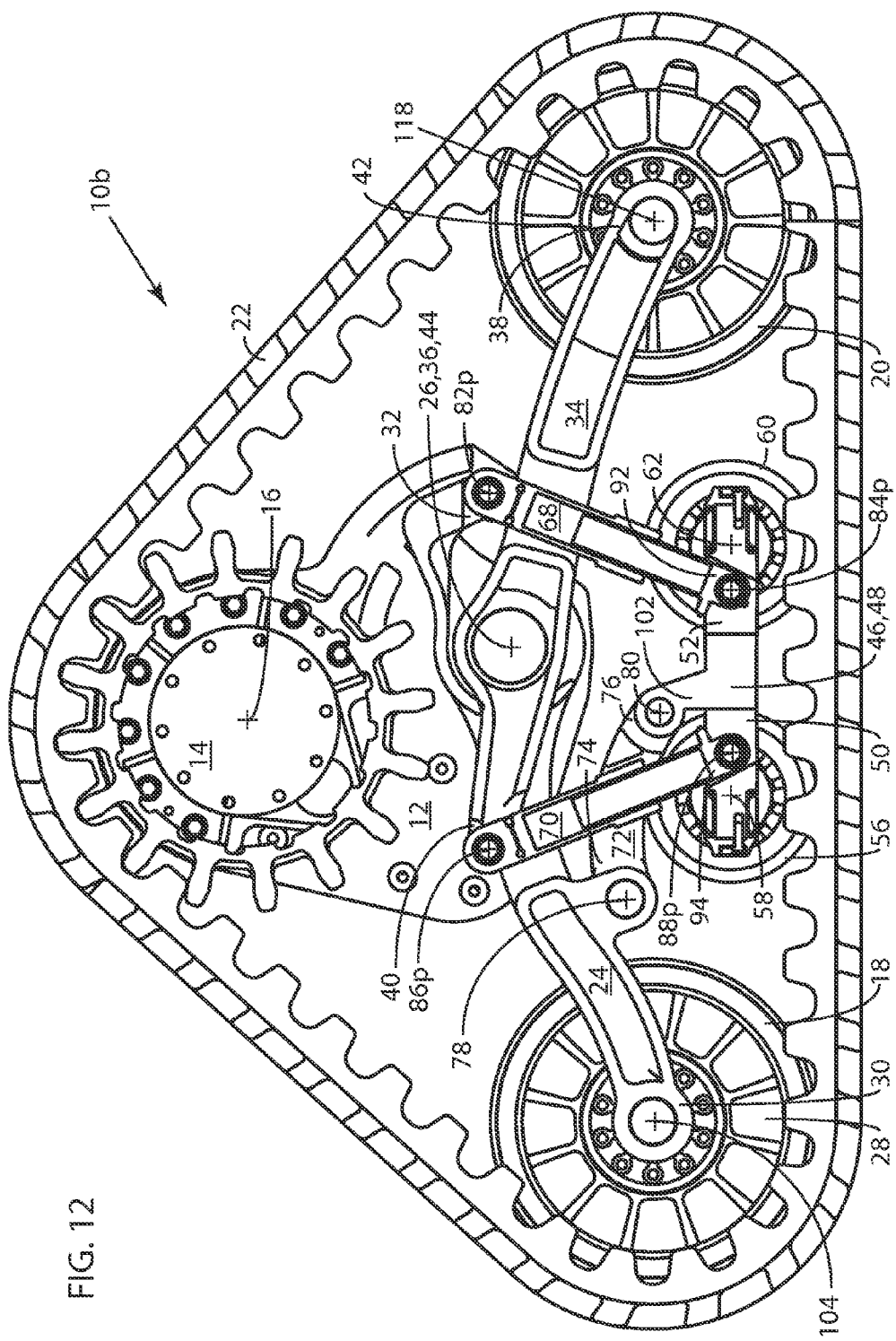
FIG. 12 is a side-elevation drawing (similar to FIG. 4) of a second alternative embodiment of the vehicle track-module apparatus of this invention. Such embodiment is similar to the embodiment of FIG. 11 but does not include a tensioning element and the leading-idler assembly includes only the leading idler wheel.

FIG. 12 is a side-elevation drawing (similar to FIG. 4) of a second alternative embodiment 10b of the vehicle track-module apparatus of this invention. Embodiment 10b is similar to first alternative embodiment 10a except that tensioning element 106 has been eliminated and leading-idler assembly 30 primarily includes only leading idler wheels 18. A track module similar to second alternative embodiment 10b may be used to reduce complexity and cost when compared to embodiment 10. Similar to first embodiment 10a, second embodiment 10b may also provide a shorter distance between the leading and trailing wheels if such a configuration is desirable.

Figure 13:
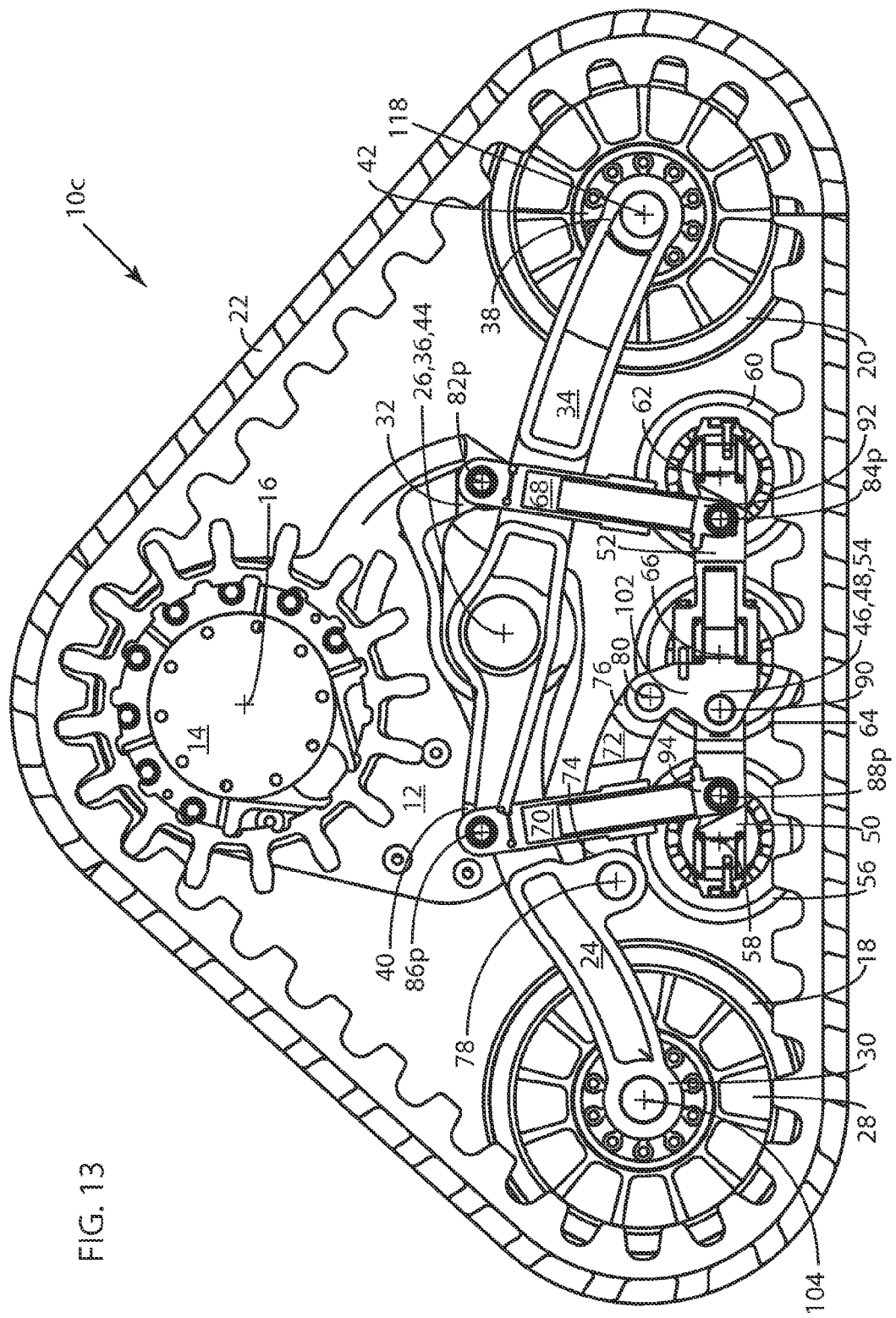
FIG. 13 is a side-elevation drawing (similar to FIG. 4) of a third alternative embodiment of the vehicle track-module apparatus of this invention. Such embodiment is similar to the embodiment of FIG. 4 but does not include a tensioning element and the leading-idler assembly includes only the leading idler wheel.

FIG. 13 is a side-elevation drawing (similar to FIG. 4) of a third alternative embodiment 10c of the vehicle track-module apparatus of this invention. Embodiment 10c is similar to embodiment 10 except that tensioning element 106 has been eliminated and leading-idler assembly 30 primarily includes only leading idler wheels 18. A track module similar to third alternative embodiment 10c may be used to reduce complexity and cost when compared to embodiment 10.

Figure 14:
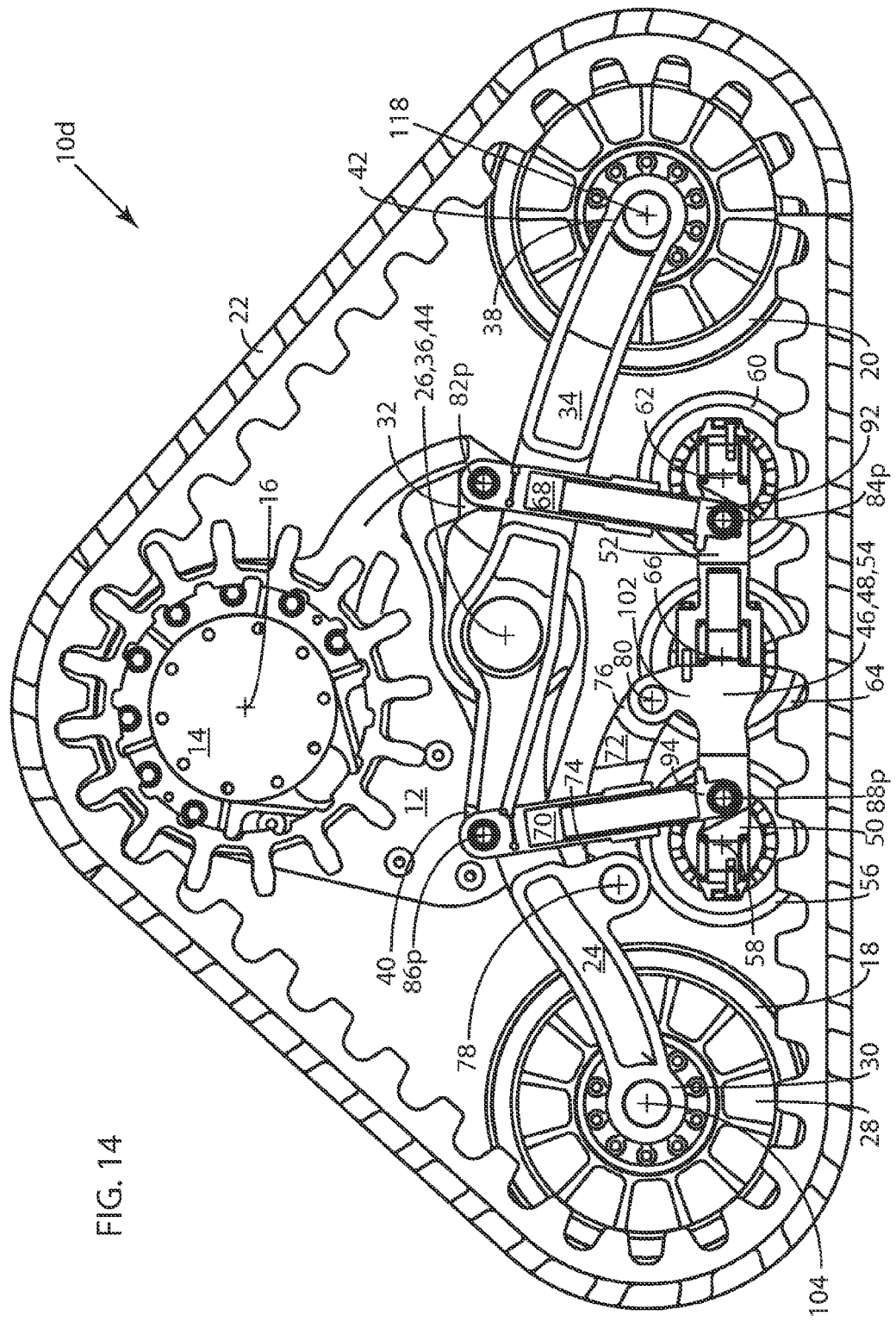
FIG. 14 is a side-elevation drawing (similar to FIG. 4) of a fourth alternative embodiment of the vehicle track-module apparatus of this invention. Such embodiment is similar to the embodiment of FIG. 13 but does not include the third bogie-assembly axis.

FIG. 14 is a side-elevation drawing (similar to FIG. 4) of a fourth alternative embodiment 10d of the vehicle track-module apparatus of this invention. Embodiment 10d is similar to third alternative embodiment 10c except that third bogie-assembly axis 90 has been eliminated with corresponding changes in other components to accommodate such modification. A track module similar to fourth alternative embodiment 10d may be used to reduce complexity and cost when compared to embodiment 10. In the case of fourth embodiment 10d, a degree-of-freedom within bogie assembly 46 has been removed; under certain operational conditions such as travel mainly on generally even terrain, this reduction in compliance may be acceptable.

Figure 15A:
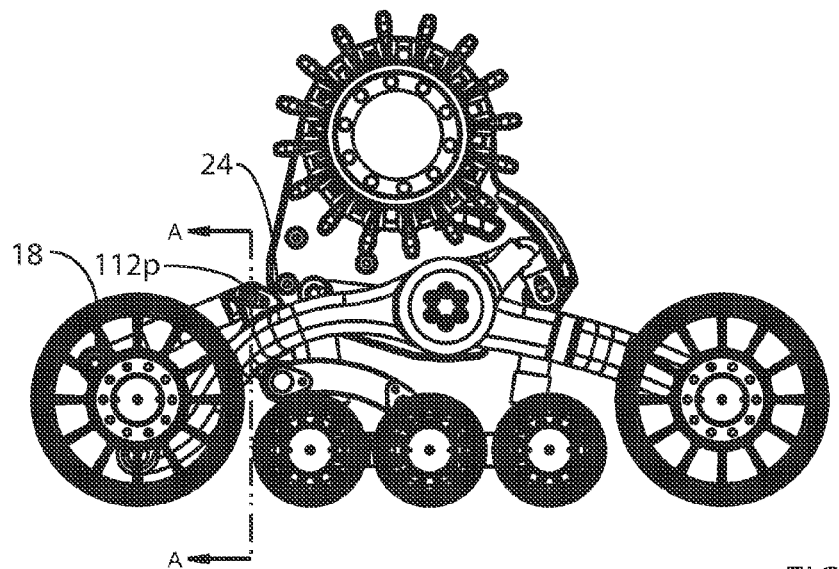
FIG. 15A is side-elevation drawing of portions of the embodiment of the vehicle track-module apparatus of FIG. 1 to illustrate the detail of an end of the tensioning element.
Figure 15B:
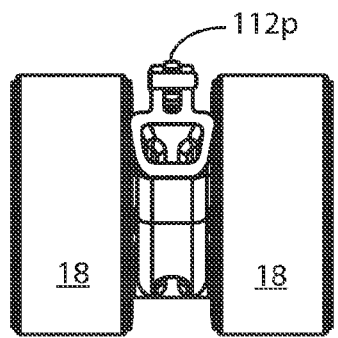
FIG. 15B is a sectional view of FIG. 15A.

FIG. 15A is side-elevation drawing of portions of vehicle track-module apparatus 10 to illustrate the detail of tensioning-element first end 108 of tensioning element 106. FIG. 15B is a sectional view (section A-A) as indicated in FIG. 15A. Section A-A passes through proximal tensioning pivot 112p at the rotatable attachment between tensioning element 106 and leading suspension arm 24.

Figure 15C:
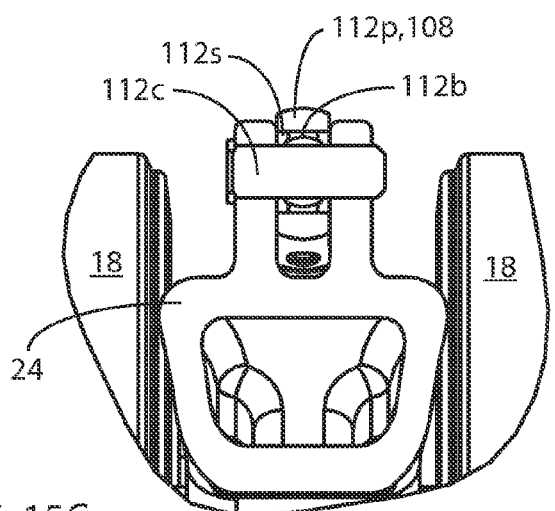
FIG. 15C is an enlargement of a portion of FIG. 15B particularly showing an end of the tensioning element.

FIG. 15C is a further enlargement of a portion of FIG. 15B to show even more detail of proximal tensioning pivot 112p. As described above, certain pivot joints within apparatus 10 involve structures which provide more than one degree-of-freedom of rotation. In the naming convention used herein, the word "pivot" is used for such more than one degree-of-freedom connections. Within apparatus 10, these include 82p, 84p, 86p, 88p, 112p and 116p, and FIGS. 15A-15C are used to illustrate one such pivot. In embodiment 10, all such pivots are spherical bearings as is shown for pivot 112p.

Referring to FIG. 15C, proximal tensioning pivot 112p includes a spherical bearing which includes a ball 112b which rotates in a socket 112s on leading suspension arm 24. A mechanical connector 112c holds ball 112c in socket 112s.

By using the inventive structure of the various embodiments of track-module apparatus disclosed herein and by selecting the dimensions of the various components, a track-module designer is able to set the load distribution on the ground-engaging wheels to meet the requirements of a particular vehicle application. For example, it may be desirable to have the leading or trailing wheels take somewhat different percentages of the load on the vehicle. And often it is desirable, when the apparatus has more than one bogie-wheel axle, to have each of the bogie-wheel axles support substantially the same vehicle load. A set of linkage dimensions can be chosen to distribute the load supported by the bogies as desired.

Kinematic analysis methods well-known to those skilled in the art of mechanical systems can be used to evaluate the load-distribution performance of a specific set of linkage dimensions in apparatus 10. In the example described below and in FIGS. 17A and 17B, such analysis was used to compute the load distribution under a set of different load conditions. Referring to the schematic diagram of FIG. 10, the dimensions are represented by the following notation. A horizontal dimension includes the letter "H" followed by two reference numbers separated by a colon. Thus, H44:118 is the horizontal distance from suspension axis 44 to trailing-idler axis 118. The letter "V" indicates a vertical dimension, and the letter "D" a diameter. FIG. 17A summarizes a set of dimensions for a representative configuration of track-module apparatus 10 with suspension elements 68 and 70 in common hydraulic circuit 134.

FIG. 17B summarizes the results of analysis of the representative example of FIG. 17A. As can be seen, in this example, the loads F2, F3 and F4 on bogie wheels 56, 64 and 60, respectively, are and remain evenly distributed among the bogie wheels, and the addition of various portions of the total loading from vehicle weight, track tension, braking and pull cause very modest changes to the load distribution percentages.

Figure 18:
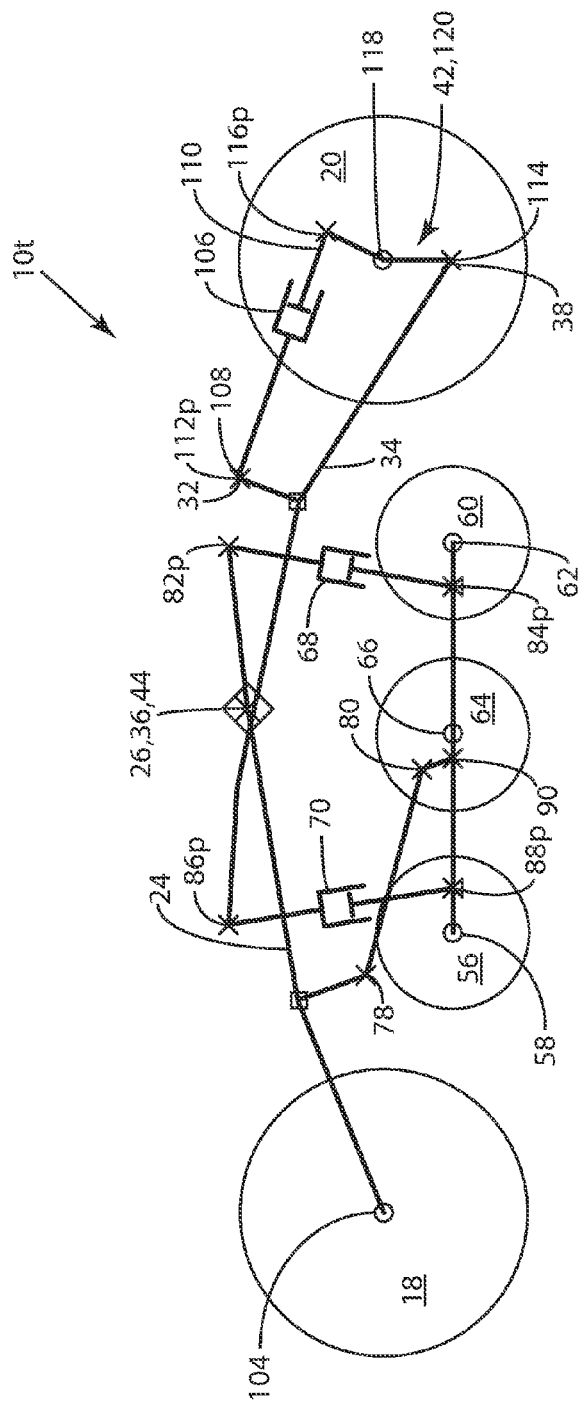
FIG. 18 is a schematic diagram of an embodiment of the inventive track-module apparatus in which a tensioning element is mounted with respect to the trailing idler wheel.

The power source for the track-module apparatus of this invention is not limited to a rotating power shaft of the vehicle. Other power-source configurations are contemplated by this invention, such as a hydraulic motor or other power source on the vehicle or a mechanical, hydraulic or other power source directly mounted on the apparatus itself FIG. 18 is a schematic diagram showing an embodiment 10t of the inventive track-module apparatus in which tensioning element 106 is mounted with respect to trailing idler wheel 20, and trailing-idler assembly 42 includes additional linkage elements. Also, leading-wheel assembly 30 is simplified accordingly.

In embodiment 10t, tensioning element 106 provides attachment between trailing suspension arm 34 and trailing-idler assembly 42. Trailing-idler assembly 42 includes trailing idler wheels 20 and trailing-idler axis 118 about which trailing idler wheels 20 rotate. Trailing-idler assembly 42 includes wheel linkage 120 at trailing-idler axis 118; in apparatus 10t, wheel linkage 120 is idler linkage 120. Trailing-arm distal end 38 is rotatably attached to idler linkage 120 at an idler offset axis 114 which is offset from trailing-idler axis 118.

Tensioning-element first end 108 of tensioning element 106 is rotatably attached to trailing suspension arm 34 at proximal tensioning pivot 112p at rearward suspension end 32 between trailing-arm distal end 38 and suspension-arm axis 44. Tensioning-element second end 110 is rotatably attached to trailing-idler assembly 42 at distal tensioning pivot 116p offset from leading-idler axis 118. Idler offset axis 114 is parallel to leading-idler axis 118 and angularly displaced therearound such that idler linkage 120 is a class 2 lever with idler offset axis 114 being the fulcrum thereof. Tension forces on track 22 are provided through idler wheels 20 by tensioning element 106 through the class 2 lever action of idler linkage 120 acted on by tensioning element 106.

It may be desirable to have a tensioning element related to each of the leading and trailing wheel assemblies when certain performance requirements need to be addressed.

While the principles of this invention are shown and described here in connection with specific embodiments, it is to be understood that such embodiments are by way of example and are not limiting.

The invention claimed is:

1. In vehicle track-module apparatus including a module frame, a drive wheel rotatable with respect to the frame, leading and trailing ground-engaging wheels and at least one ground-engaging bogie wheel therebetween, and an endless track extending around the wheels and driven by the drive wheel, the improvement comprising:
a leading suspension arm rotatably attached to the frame at a leading arm axis and extending forwardly to a leading-arm distal end at which a leading-wheel assembly is rotatably attached and rearwardly to a rearward suspension end;
a trailing suspension arm rotatably attached to the frame at a trailing arm axis and extending rearwardly to a trailing-arm distal end at which a trailing-wheel assembly is rotatably attached and forwardly to a forward suspension end;
a bogie assembly having a bogie mount and the at least one bogie wheel rotatable with respect thereto; and
leading and trailing suspension elements rotatably attached to and extending from the rearward and forward suspension ends, respectively, to rearward and forward rotatable bogie-mount connections, respectively.

2. The vehicle track-module apparatus of claim 1 wherein the leading-arm and trailing-arm axes coincide at a suspension-arm axis.

3. The vehicle track-module apparatus of claim 2 wherein the drive wheel is rotatable about a drive wheel axis and the suspension-arm axis is at a level lower than the drive wheel axis.

4. The vehicle track-module apparatus of claim 3 wherein the suspension-arm axis is rearward of the drive wheel axis.

5. The vehicle track-module apparatus of claim 1 wherein:
the bogie assembly further includes a bogie-assembly arm rotatably attached (a) at a bogie-assembly arm distal end to the leading suspension arm at a first bogie-assembly axis between the leading-arm distal end and the suspension-arm axis and (b) at a bogie-assembly arm proximal end to the bogie mount at a second bogie-assembly axis;
the leading suspension element is rotatably attached (a) to the rearward suspension end at a leading suspension-element pivot and (b) to the rearward bogie-mount connection at a first bogie-assembly pivot; and
the trailing suspension element is rotatably attached (a) to the forward suspension end at a trailing suspension-element pivot and (b) to the forward bogie-mount connection at a second bogie-assembly pivot.

6. The vehicle track-module apparatus of claim 5 wherein the at least one bogie wheel includes at least one leading bogie wheel and at least one trailing bogie wheel, and the bogie mount includes:
a bogie-mount forward portion having the at least one leading bogie wheel attached thereto at a leading bogie axis, the bogie-mount forward portion including the forward bogie-mount connection; and
a bogie-mount rearward portion having the at least one trailing bogie wheel attached thereto at a trailing-bogie axis, the bogie-mount rearward portion including the rearward bogie-mount connection.

7. The vehicle track-module apparatus of claim 6 including at least two leading bogie wheels and at least two trailing bogie wheels and wherein the leading bogie axis rotates on a leading bogie roll axis perpendicular thereto and the trailing bogie axis rotates on a trailing bogie roll axis perpendicular thereto.

8. The vehicle track-module apparatus of claim 6 wherein the bogie-mount forward and rearward portions are rotatably attached at a third bogie-assembly axis.

9. The vehicle track-module apparatus of claim 6 wherein the bogie mount further includes a bogie-mount middle portion having at least one middle bogie wheel attached thereto at a middle bogie axis.

10. The vehicle track-module apparatus of claim 9 including at least two leading bogie wheels, at least two trailing bogie wheels, and at least two middle bogie wheels and wherein:
the leading bogie axis rotates on a leading bogie roll axis perpendicular thereto;

the middle bogie axis rotates on a middle bogie roll axis perpendicular thereto; and the trailing bogie axis rotates on a trailing bogie roll axis perpendicular thereto.

11. The vehicle track-module apparatus of claim 10 wherein the bogie-mount forward and middle portions are rotatably attached at a third bogie-assembly axis.

12. The vehicle track-module apparatus of claim 1 further including a tensioning element having first and second ends, the first end rotatably attached to the leading suspension arm at a proximal tensioning pivot between the leading-arm distal end and the leading arm axis, and wherein the leading-wheel assembly includes:

at least one leading wheel rotatable about a leading-wheel axis; and a wheel linkage at the leading-wheel axis, the distal end of the leading suspension arm being rotatably attached to the wheel linkage at a wheel offset axis offset from the leading-wheel axis, the second end of the tensioning element being rotatably attached to the wheel linkage at a distal tensioning pivot which is offset from the leading-wheel axis, the distal tensioning pivot and the wheel offset axis being angularly displaced around the leading-wheel axis such that the wheel linkage is a class 2 lever with the wheel offset axis being the fulcrum thereof.

13. The vehicle track-module apparatus of claim 12 wherein the trailing-wheel assembly includes a trailing-wheel axis at the trailing-arm distal end and at least one trailing wheel rotatable about the trailing-wheel axis.

14. The vehicle track-module apparatus of claim 12 wherein the proximal and distal tensioning pivots are configured to permit rotation having at least two degrees-of-freedom.

15. The vehicle track-module apparatus of claim 1 wherein:

rotatable attachments of the leading and trailing suspension elements at the rearward and forward suspension ends, respectively, are configured to permit rotation having at least two degrees-of-freedom; and the rearward and forward rotatable bogie-mount connections are configured to permit rotation having at least two degrees-of-freedom.

16. The vehicle track-module apparatus of claim 1 further including rotatable attachments of the leading and trailing suspension elements to the frame at the rearward and forward suspension ends, respectively, which are configured to permit rotation having at least two degrees-of-freedom and the rearward and forward rotatable bogie mount connections are configured to permit rotation having at least two degrees-of-freedom.

17. The vehicle track-module apparatus of claim 1 wherein the leading and trailing suspension elements each include gas-filled components to provide spring force.

18. The vehicle track-module apparatus of claim 17 wherein the leading and trailing suspension elements each further include hydraulic components.

19. The vehicle track-module apparatus of claim 18 wherein the leading and trailing suspension elements are on a common hydraulic circuit.

20. The vehicle track-module apparatus of claim 19 further including an external accumulator hydraulically connected to the common hydraulic circuit.

21. The vehicle track-module apparatus of claim 1 wherein the leading and trailing wheels have diameters which are substantially the same as each other.

22. The vehicle track-module apparatus of claim 1 including plural bogie wheels and wherein the bogie wheels have diameters which are substantially the same as each other.

23. The vehicle track-module apparatus of claim 1 further including a tensioning element having first and second ends, the first end rotatably attached to the trailing suspension arm at a proximal tensioning pivot between the trailing-arm distal end and the trailing arm axis, and wherein the trailing-wheel assembly includes:

at least one trailing wheel rotatable about a trailing-wheel axis; and a wheel linkage at the trailing-wheel axis, the distal end of the trailing suspension arm being rotatably attached to the wheel linkage at a wheel offset axis offset from the trailing-wheel axis, the second end of the tensioning element being rotatably attached to the wheel linkage at a distal tensioning pivot which is offset from the trailing-wheel axis, the distal tensioning pivot and the wheel offset axis being angularly displaced around the trailing-wheel axis such that the wheel linkage is a class 2 lever with the wheel offset axis being the fulcrum thereof.

24. The vehicle track-module apparatus of claim 23 wherein the leading-wheel assembly includes a leading-wheel axis at the leading-arm distal end and at least one leading wheel rotatable about the leading-wheel axis.

25. The vehicle track-module apparatus of claim 23 wherein the proximal and distal tensioning pivots are configured to permit rotation having at least two degrees-of-freedom.

26. In vehicle track-module apparatus including a module frame, leading and trailing ground-engaging idler wheels and at least one ground-engaging bogie wheel therebetween, a drive wheel positioned above and between the idler wheels and rotatable with respect to the frame, and an endless track extending around the wheels and driven by the drive wheel, the improvement comprising:

a leading suspension arm rotatably attached to the frame at a leading arm axis and extending forwardly to a leading-arm distal end at which a leading-idler assembly is rotatably attached and rearwardly to a rearward suspension end;

a trailing suspension arm rotatably attached to the frame at a trailing arm axis and extending rearwardly to a trailing-arm distal end at which a trailing-idler assembly is rotatably attached and forwardly to a forward suspension end;

a bogie assembly having a bogie mount and the at least one bogie wheel rotatable with respect thereto; and leading and trailing suspension elements rotatably attached to and extending from the rearward and forward suspension ends, respectively, to rearward and forward rotatable bogie-mount connections, respectively.

27. The vehicle track-module apparatus of claim 26 wherein the leading-arm and trailing-arm axes coincide at a suspension-arm axis.

28. The vehicle track-module apparatus of claim 27 wherein the drive wheel is rotatable about a drive wheel axis and the suspension-arm axis is at a level lower than the drive wheel axis.

29. The vehicle track-module apparatus of claim 28 wherein the suspension-arm axis is rearward of the drive wheel axis.

30. The vehicle track-module apparatus of claim 26 wherein:

the bogie assembly further includes a bogie-assembly arm rotatably attached (a) at a bogie-assembly arm distal end to the leading suspension arm at a first bogie-assembly axis between the leading-arm distal end and the suspension-arm axis and (b) at a bogie-assembly arm proximal end to the bogie mount at a second bogie-assembly axis;

the leading suspension element is rotatably attached (a) to the rearward suspension end at a leading suspension-element pivot and (b) to the rearward bogie-mount connection at a first bogie-assembly pivot; and the trailing suspension element is rotatably attached (a) to the forward suspension end at a trailing suspension-element pivot and (b) to the forward bogie-mount connection at a second bogie-assembly pivot.

31. The vehicle track-module apparatus of claim 30 wherein the at least one bogie wheel includes at least one leading bogie wheel and at least one trailing bogie wheel, and the bogie mount includes:

a bogie-mount forward portion having the at least one leading bogie wheel attached thereto at a leading bogie axis, the bogie-mount forward portion including the forward bogie-mount connection; and a bogie-mount rearward portion having the at least one trailing bogie wheel attached thereto at a trailing-bogie axis, the bogie-mount rearward portion including the rearward bogie-mount connection.

32. The vehicle track-module apparatus of claim 31 including at least two leading bogie wheels and at least two trailing bogie wheels and wherein the leading bogie axis rotates on a leading bogie roll axis perpendicular thereto and the trailing bogie axis rotates on a trailing bogie roll axis perpendicular thereto.

33. The vehicle track-module apparatus of claim 31 wherein the bogie-mount forward and rearward portions are rotatably attached at a third bogie-assembly axis.

34. The vehicle track-module apparatus of claim 31 wherein the bogie mount further includes a bogie-mount middle portion having at least one middle bogie wheel attached thereto at a middle bogie axis.

35. The vehicle track-module apparatus of claim 34 including at least two leading bogie wheels, at least two trailing bogie wheels, and at least two middle bogie wheels and wherein:

the leading bogie axis rotates on a leading bogie roll axis perpendicular thereto;

the middle bogie axis rotates on a middle bogie roll axis perpendicular thereto; and the trailing bogie axis rotates on a trailing bogie roll axis perpendicular thereto.

36. The vehicle track-module apparatus of claim 35 wherein the bogie-mount forward and middle portions are rotatably attached at a third bogie-assembly axis.

37. The vehicle track-module apparatus of claim 26 further including a tensioning element having first and second ends, the first end rotatably attached to the leading suspension arm at a proximal tensioning pivot between the leading-arm distal end and the leading arm axis, and wherein the leading-wheel assembly includes:

at least one leading idler wheel rotatable about a leading-idler axis; and an idler linkage at the leading-idler axis, the distal end of the leading suspension arm being rotatably attached to the idler linkage at an idler offset axis offset from the leading-idler axis, the second end of the tensioning element being rotatably attached to the idler linkage at a distal tensioning pivot which is offset from the leading-idler axis, the distal tensioning pivot and the idler offset axis being angularly displaced around the leading-idler axis such that the idler linkage is a class 2 lever with the idler offset axis being the fulcrum thereof.

38. The vehicle track-module apparatus of claim 37 wherein the trailing-idler assembly includes a trailing-idler axis at the trailing-arm distal end and at least one trailing idler wheel rotatable about the trailing-idler axis.

39. The vehicle track-module apparatus of claim 37 wherein the proximal and distal tensioning pivots are configured to permit rotation having at least two degrees-of-freedom.

40. The vehicle track-module apparatus of claim 26 wherein:

rotatable attachments of the leading and trailing suspension elements at the rearward and forward suspension ends, respectively, are configured to permit rotation having at least two degrees-of-freedom; and the rearward and forward rotatable bogie-mount connections are configured to permit rotation having at least two degrees-of-freedom.

41. The vehicle track-module apparatus of claim 26 further including rotatable attachments of the leading and trailing suspension elements to the frame at the rearward and forward suspension ends, respectively, which are configured to permit rotation having at least two degrees-of-freedom and the rearward and forward rotatable bogie-mount connections are configured to permit rotation having at least two degrees-of-freedom.

42. The vehicle track-module apparatus of claim 26 wherein the leading and trailing idler wheels have diameters which are substantially the same.

43. The vehicle track-module apparatus of claim 26 including plural bogie wheels and wherein the bogie wheels have diameters which are substantially the same.

44. The vehicle track-module apparatus of claim 26 configured such that the drive wheel is driven by a driving mechanism powered by a vehicle.

45. The vehicle track-module apparatus of claim 44 wherein the driving mechanism is a gearbox attachable to a driven axle of the vehicle.

46. The vehicle track-module apparatus of claim 26 further including a tensioning element having first and second ends, the first end rotatably attached to the trailing suspension arm at a proximal tensioning pivot between the trailing-arm distal end and the trailing arm axis, and wherein the trailing-wheel assembly includes:

at least one trailing idler wheel rotatable about a trailing-idler axis; and an idler linkage at the trailing-idler axis, the distal end of the trailing suspension arm being rotatably attached to the idler linkage at an idler offset axis offset from the trailing-idler axis, the second end of the tensioning element being rotatably attached to the idler linkage at a distal tensioning pivot which is offset from the trailing-idler axis, the distal tensioning pivot and the idler offset axis being angularly displaced around the trailing-idler axis such that the idler linkage is a class 2 lever with the idler offset axis being the fulcrum thereof.

47. The vehicle track-module apparatus of claim 46 wherein the leading-idler assembly includes a leading-idler axis at the leading-arm distal end and at least one leading idler wheel rotatable about the leading-idler axis.

48. The vehicle track-module apparatus of claim 46 wherein the proximal and distal tensioning pivots are configured to permit rotation having at least two degrees-of-freedom.

* * * * *